United States Patent
Erol et al.

(10) Patent No.: US 8,385,589 B2
(45) Date of Patent: Feb. 26, 2013

(54) WEB-BASED CONTENT DETECTION IN IMAGES, EXTRACTION AND RECOGNITION

(76) Inventors: Berna Erol, San Jose, CA (US); Jonathan J. Hull, San Carlos, CA (US)

(*) Notice: Subject to any disclaimer, the term of this patent is extended or adjusted under 35 U.S.C. 154(b) by 721 days.

(21) Appl. No.: 12/121,275

(22) Filed: May 15, 2008

(65) Prior Publication Data

US 2009/0285444 A1    Nov. 19, 2009

(51) Int. Cl.
*G06K 9/00* (2006.01)
(52) U.S. Cl. ........................................................ 382/100
(58) Field of Classification Search .................. 382/100, 382/176, 229, 181, 199
See application file for complete search history.

(56) References Cited

U.S. PATENT DOCUMENTS

| | | |
|---|---|---|
| 1,915,993 A | 6/1933 | Handel |
| 4,759,075 A | 7/1988 | Lipkie et al. |
| 5,027,421 A | 6/1991 | Kanno |
| 5,035,302 A | 7/1991 | Thangavelu |
| 5,077,805 A | 12/1991 | Tan |
| 5,109,439 A | 4/1992 | Froessl |
| 5,263,100 A | 11/1993 | Kim et al. |
| 5,392,447 A | 2/1995 | Schlack et al. |
| 5,416,892 A | 5/1995 | Loken-Kim |
| 5,432,864 A | 7/1995 | Lu et al. |
| 5,465,353 A | 11/1995 | Hull et al. |
| 5,493,689 A | 2/1996 | Waclawsky et al. |
| 5,546,502 A | 8/1996 | Hart et al. |
| 5,553,217 A | 9/1996 | Hart et al. |
| 5,555,556 A | 9/1996 | Ozaki |
| 5,579,471 A | 11/1996 | Barber et al. |
| 5,706,097 A | 1/1998 | Schelling et al. |
| 5,752,055 A | 5/1998 | Redpath et al. |
| 5,757,953 A | 5/1998 | Jang |
| 5,761,344 A | 6/1998 | Al-Hussein |
| 5,764,277 A | 6/1998 | Loui et al. |
| 5,806,005 A | 9/1998 | Hull et al. |
| 5,832,474 A | 11/1998 | Lopresti et al. |
| 5,832,530 A | 11/1998 | Paknad et al. |
| 5,842,194 A | 11/1998 | Arbuckle |

(Continued)

FOREIGN PATENT DOCUMENTS

| | | |
|---|---|---|
| CN | 1245935 | 3/2000 |
| EP | 0706283 A | 4/1996 |

(Continued)

OTHER PUBLICATIONS

GuruLib, "Online Home Library Management," Dec. 28, 2007, http://gurulib.wordpress.com/2007/12/28/a-flash-based-webcam-barcode-reader/.*

(Continued)

*Primary Examiner* — Shefali Goradia
(74) *Attorney, Agent, or Firm* — Patent Law Works LLP

(57) ABSTRACT

A web-based image detection system includes: an image capture device, a web browser, a plug-in, and a recognition server. A captured image is processed by the plug-in to assess whether a pre-determined content type is contained with in the image. Once an initial analysis at the browser plug-in detects a pre-determined content type in an image, the image is transmitted to a recognition server for content recognition of the image by content type. The system thus enables users to link documents or other image types to electronic data using only a capture device and a web browser.

48 Claims, 24 Drawing Sheets

U.S. PATENT DOCUMENTS

| | | | |
|---|---|---|---|
| 5,867,597 A | 2/1999 | Peairs et al. | |
| 5,873,077 A | 2/1999 | Kanoh et al. | |
| 5,892,843 A * | 4/1999 | Zhou et al. | 382/176 |
| 5,899,999 A | 5/1999 | De Bonet | |
| 5,905,502 A | 5/1999 | Deering | |
| 5,907,835 A | 5/1999 | Yokomizo et al. | |
| 5,918,012 A | 6/1999 | Astiz et al. | |
| 5,933,525 A | 8/1999 | Makhoul et al. | |
| 5,956,468 A | 9/1999 | Ancin | |
| 5,968,175 A | 10/1999 | Morishita et al. | |
| 5,999,664 A | 12/1999 | Mahoney et al. | |
| 5,999,915 A | 12/1999 | Nahan et al. | |
| 6,035,055 A | 3/2000 | Wang et al. | |
| 6,104,834 A | 8/2000 | Hull | |
| 6,121,969 A | 9/2000 | Jain et al. | |
| 6,138,129 A | 10/2000 | Combs | |
| 6,192,157 B1 | 2/2001 | Prebble | |
| 6,208,771 B1 | 3/2001 | Jared et al. | |
| 6,223,171 B1 | 4/2001 | Chaudhuri et al. | |
| 6,253,201 B1 | 6/2001 | Abdel-Mottaleb et al. | |
| 6,301,386 B1 | 10/2001 | Zhu et al. | |
| 6,332,039 B1 | 12/2001 | Bando et al. | |
| 6,345,274 B1 | 2/2002 | Zhu et al. | |
| 6,353,822 B1 | 3/2002 | Lieberman | |
| 6,363,381 B1 | 3/2002 | Lee et al. | |
| 6,393,142 B1 | 5/2002 | Swain et al. | |
| 6,397,213 B1 | 5/2002 | Cullen et al. | |
| 6,405,172 B1 | 6/2002 | Baker et al. | |
| 6,408,257 B1 | 6/2002 | Harrington et al. | |
| 6,411,953 B1 | 6/2002 | Ganapathy et al. | |
| 6,448,979 B1 | 9/2002 | Schena et al. | |
| 6,457,026 B1 | 9/2002 | Graham et al. | |
| 6,460,036 B1 | 10/2002 | Herz | |
| 6,470,264 B2 | 10/2002 | Bide | |
| 6,504,571 B1 | 1/2003 | Narayanaswami et al. | |
| 6,537,324 B1 | 3/2003 | Tabata et al. | |
| 6,567,799 B2 | 5/2003 | Sweet et al. | |
| 6,574,375 B1 | 6/2003 | Cullen et al. | |
| 6,574,644 B2 | 6/2003 | Hsu et al. | |
| 6,584,223 B1 | 6/2003 | Shiiyama | |
| 6,611,862 B2 | 8/2003 | Reisman | |
| 6,686,970 B1 | 2/2004 | Windle | |
| 6,732,915 B1 | 5/2004 | Nelson et al. | |
| 6,751,343 B1 | 6/2004 | Ferrell et al. | |
| 6,753,883 B2 | 6/2004 | Schena et al. | |
| 6,766,363 B1 | 7/2004 | Rothschild | |
| 6,791,605 B1 | 9/2004 | Reele et al. | |
| 6,799,201 B1 | 9/2004 | Lee et al. | |
| 6,804,332 B1 | 10/2004 | Miner et al. | |
| 6,804,659 B1 | 10/2004 | Graham et al. | |
| 6,813,381 B2 | 11/2004 | Ohnishi et al. | |
| 6,824,057 B2 | 11/2004 | Rathus et al. | |
| 6,827,267 B2 | 12/2004 | Rathus et al. | |
| 6,830,187 B2 | 12/2004 | Rathus et al. | |
| 6,834,804 B2 | 12/2004 | Rathus et al. | |
| 6,842,755 B2 | 1/2005 | Maslov | |
| 6,843,411 B2 | 1/2005 | Rathus et al. | |
| 6,859,909 B1 | 2/2005 | Lerner et al. | |
| 6,865,302 B2 | 3/2005 | Chang | |
| 6,866,196 B1 | 3/2005 | Rathus et al. | |
| 6,922,699 B2 | 7/2005 | Schuetze et al. | |
| 6,929,182 B2 | 8/2005 | Rathus et al. | |
| 6,940,491 B2 | 9/2005 | Incertis Carro | |
| 6,963,358 B2 | 11/2005 | Cohen et al. | |
| 6,964,374 B1 | 11/2005 | Djuknic et al. | |
| 6,980,962 B1 | 12/2005 | Arganbright et al. | |
| 6,981,224 B1 | 12/2005 | Gardner et al. | |
| 6,993,573 B2 | 1/2006 | Hunter | |
| 7,013,309 B2 | 3/2006 | Chakraborty et al. | |
| 7,031,965 B1 | 4/2006 | Moriya et al. | |
| 7,035,467 B2 | 4/2006 | Nicponski | |
| 7,051,086 B2 | 5/2006 | Rhoads et al. | |
| 7,062,722 B1 | 6/2006 | Carlin et al. | |
| 7,089,487 B2 | 8/2006 | Tsai | |
| 7,092,953 B1 | 8/2006 | Haynes | |
| 7,134,095 B1 | 11/2006 | Smith et al. | |
| 7,136,093 B1 | 11/2006 | Itoh et al. | |
| 7,150,399 B2 | 12/2006 | Barrus et al. | |
| 7,167,574 B2 | 1/2007 | Kim | |
| 7,174,031 B2 | 2/2007 | Rhoads et al. | |
| 7,185,274 B1 | 2/2007 | Rubin et al. | |
| 7,206,820 B1 | 4/2007 | Rhoads et al. | |
| 7,232,057 B2 | 6/2007 | Rathus et al. | |
| 7,236,632 B2 | 6/2007 | Erol et al. | |
| 7,239,402 B2 | 7/2007 | Soler et al. | |
| 7,240,279 B1 | 7/2007 | Chartier et al. | |
| 7,249,123 B2 | 7/2007 | Edler et al. | |
| 7,251,689 B2 | 7/2007 | Wesley | |
| 7,263,205 B2 | 8/2007 | Lev | |
| 7,305,435 B2 | 12/2007 | Hamynen | |
| 7,310,769 B1 | 12/2007 | Dash | |
| 7,310,779 B2 | 12/2007 | Carro | |
| 7,337,175 B2 | 2/2008 | Comps et al. | |
| 7,359,094 B1 | 4/2008 | Sayuda | |
| 7,363,580 B2 | 4/2008 | Tabata et al. | |
| 7,366,979 B2 | 4/2008 | Spielberg et al. | |
| 7,386,789 B2 | 6/2008 | Chao et al. | |
| 7,392,287 B2 | 6/2008 | Ratcliff, III | |
| 7,406,214 B2 | 7/2008 | Rhoads et al. | |
| 7,421,153 B1 | 9/2008 | Ronca et al. | |
| 7,421,155 B2 | 9/2008 | King et al. | |
| 7,424,541 B2 | 9/2008 | Bourne | |
| 7,437,023 B2 | 10/2008 | King et al. | |
| 7,450,760 B2 | 11/2008 | Molnar et al. | |
| 7,458,014 B1 | 11/2008 | Rubin et al. | |
| 7,463,270 B2 | 12/2008 | Vale et al. | |
| 7,489,415 B2 | 2/2009 | Furuta et al. | |
| 7,509,386 B2 | 3/2009 | Miyashita | |
| 7,546,524 B1 | 6/2009 | Bryar et al. | |
| 7,567,262 B1 | 7/2009 | Clemens et al. | |
| 7,585,224 B2 | 9/2009 | Dyke-Wells | |
| 7,587,681 B2 | 9/2009 | Kake et al. | |
| 7,593,605 B2 | 9/2009 | King et al. | |
| 7,593,961 B2 | 9/2009 | Eguchi et al. | |
| 7,613,686 B2 | 11/2009 | Rui | |
| 7,623,259 B2 | 11/2009 | Tojo | |
| 7,644,078 B2 | 1/2010 | Sastry et al. | |
| 7,668,405 B2 | 2/2010 | Gallagher | |
| 7,676,767 B2 | 3/2010 | Hofmeister et al. | |
| 7,680,850 B2 | 3/2010 | Oda | |
| 7,683,933 B2 | 3/2010 | Tanaka | |
| 7,684,622 B2 * | 3/2010 | Fisher et al. | 382/199 |
| 7,702,681 B2 | 4/2010 | Brewer | |
| 7,707,039 B2 | 4/2010 | King et al. | |
| 7,746,376 B2 | 6/2010 | Mendoza et al. | |
| 7,752,534 B2 | 7/2010 | Blanchard et al. | |
| 7,761,436 B2 | 7/2010 | Norton et al. | |
| 7,765,231 B2 | 7/2010 | Rathus et al. | |
| 7,809,192 B2 * | 10/2010 | Gokturk et al. | 382/176 |
| 7,812,986 B2 | 10/2010 | Graham et al. | |
| 7,872,669 B2 | 1/2011 | Darrell et al. | |
| 7,882,113 B2 | 2/2011 | Yaeger | |
| 7,882,177 B2 * | 2/2011 | Wei et al. | 709/204 |
| 7,894,684 B2 * | 2/2011 | Monobe et al. | 382/254 |
| 7,930,292 B2 | 4/2011 | Nakajima | |
| 7,946,491 B2 * | 5/2011 | Burian et al. | 235/462.07 |
| 8,276,088 B2 | 9/2012 | Ke et al. | |
| 8,332,401 B2 | 12/2012 | Hull et al. | |
| 8,335,789 B2 | 12/2012 | Hull et al. | |
| 2001/0011276 A1 | 8/2001 | Durst, Jr. et al. | |
| 2001/0013546 A1 | 8/2001 | Ross | |
| 2001/0024514 A1 | 9/2001 | Matsunaga | |
| 2001/0042030 A1 | 11/2001 | Ito et al. | |
| 2001/0042085 A1 | 11/2001 | Peairs et al. | |
| 2001/0043741 A1 | 11/2001 | Mahoney et al. | |
| 2001/0049700 A1 | 12/2001 | Ichikura | |
| 2002/0038430 A1 | 3/2002 | Edwards et al. | |
| 2002/0052872 A1 | 5/2002 | Yada | |
| 2002/0054059 A1 | 5/2002 | Schneiderman | |
| 2002/0063709 A1 | 5/2002 | Gilbert et al. | |
| 2002/0073236 A1 | 6/2002 | Helgeson et al. | |
| 2002/0093538 A1 | 7/2002 | Carlin | |
| 2002/0102966 A1 | 8/2002 | Lev et al. | |
| 2002/0118379 A1 | 8/2002 | Chakraborty et al. | |
| 2002/0146176 A1 | 10/2002 | Meyers | |
| 2002/0154148 A1 | 10/2002 | Inoue et al. | |
| 2002/0157028 A1 | 10/2002 | Koue et al. | |

| Publication No. | Date | Name | | Publication No. | Date | Name |
|---|---|---|---|---|---|---|
| 2002/0161747 A1 | 10/2002 | Li et al. | | 2006/0041605 A1 | 2/2006 | King et al. |
| 2002/0191003 A1 | 12/2002 | Hobgood et al. | | 2006/0043188 A1 | 3/2006 | Kricorissian |
| 2002/0191848 A1 | 12/2002 | Boose et al. | | 2006/0048059 A1 | 3/2006 | Etkin |
| 2002/0194264 A1 | 12/2002 | Uchiyama et al. | | 2006/0053097 A1 | 3/2006 | King et al. |
| 2003/0025714 A1 | 2/2003 | Ebersole et al. | | 2006/0056696 A1 | 3/2006 | Jun et al. |
| 2003/0030828 A1 | 2/2003 | Soler et al. | | 2006/0056697 A1 | 3/2006 | Jun et al. |
| 2003/0098877 A1 | 5/2003 | Boegelund | | 2006/0061806 A1 | 3/2006 | King et al. |
| 2003/0110130 A1 | 6/2003 | Pelletier | | 2006/0070120 A1 | 3/2006 | Aoki et al. |
| 2003/0110216 A1 | 6/2003 | Althin et al. | | 2006/0074828 A1 | 4/2006 | Heumann et al. |
| 2003/0112930 A1 | 6/2003 | Bosik et al. | | 2006/0082438 A1 | 4/2006 | Bazakos et al. |
| 2003/0121006 A1 | 6/2003 | Tabata et al. | | 2006/0085477 A1 | 4/2006 | Phillips et al. |
| 2003/0122922 A1 | 7/2003 | Saffer et al. | | 2006/0104515 A1 | 5/2006 | King et al. |
| 2003/0126147 A1 | 7/2003 | Essafi et al. | | 2006/0112092 A1 | 5/2006 | Ziou et al. |
| 2003/0128375 A1 | 7/2003 | Ruhl et al. | | 2006/0116555 A1 | 6/2006 | Pavlidis et al. |
| 2003/0142106 A1 | 7/2003 | Saund et al. | | 2006/0119880 A1 | 6/2006 | Dandekar et al. |
| 2003/0151674 A1 | 8/2003 | Lin | | 2006/0122884 A1 | 6/2006 | Graham et al. |
| 2003/0152293 A1 | 8/2003 | Bresler et al. | | 2006/0122983 A1 | 6/2006 | King et al. |
| 2003/0169910 A1 | 9/2003 | Reisman et al. | | 2006/0140475 A1 | 6/2006 | Chin et al. |
| 2003/0187886 A1 | 10/2003 | Hull et al. | | 2006/0143176 A1 | 6/2006 | Mojsilovic et al. |
| 2003/0190094 A1 | 10/2003 | Yokota | | 2006/0147107 A1 | 7/2006 | Zhang et al. |
| 2003/0193530 A1 | 10/2003 | Blackman et al. | | 2006/0150079 A1 | 7/2006 | Albornoz et al. |
| 2003/0195883 A1 | 10/2003 | Mojsilovic et al. | | 2006/0190812 A1 | 8/2006 | Ellenby et al. |
| 2003/0212585 A1 | 11/2003 | Kyoya et al. | | 2006/0200480 A1 | 9/2006 | Harris et al. |
| 2003/0229857 A1 | 12/2003 | Sayuda et al. | | 2006/0206335 A1 | 9/2006 | Thelen et al. |
| 2004/0012569 A1* | 1/2004 | Hara ............................ 345/169 | | 2006/0218225 A1 | 9/2006 | Hee Voon et al. |
| 2004/0017482 A1 | 1/2004 | Weitman | | 2006/0227992 A1 | 10/2006 | Rathus et al. |
| 2004/0027604 A1 | 2/2004 | Jeran et al. | | 2006/0240862 A1 | 10/2006 | Neven et al. |
| 2004/0036679 A1 | 2/2004 | Emerson | | 2006/0251292 A1 | 11/2006 | Gokturk et al. |
| 2004/0042667 A1 | 3/2004 | Lee et al. | | 2006/0251339 A1 | 11/2006 | Gokturk et al. |
| 2004/0102898 A1 | 5/2004 | Yokota et al. | | 2006/0253439 A1 | 11/2006 | Ren et al. |
| 2004/0122811 A1 | 6/2004 | Page | | 2006/0253491 A1 | 11/2006 | Gokturk et al. |
| 2004/0133582 A1 | 7/2004 | Howard et al. | | 2006/0262352 A1 | 11/2006 | Hull et al. |
| 2004/0139391 A1 | 7/2004 | Stumbo et al. | | 2006/0262962 A1 | 11/2006 | Hull et al. |
| 2004/0143644 A1 | 7/2004 | Berton et al. | | 2006/0262976 A1 | 11/2006 | Hart et al. |
| 2004/0198396 A1 | 10/2004 | Fransioli | | 2006/0285172 A1 | 12/2006 | Hull et al. |
| 2004/0199531 A1 | 10/2004 | Kim et al. | | 2006/0285755 A1 | 12/2006 | Hager et al. |
| 2004/0201706 A1 | 10/2004 | Shimizu et al. | | 2006/0285772 A1 | 12/2006 | Hull et al. |
| 2004/0205347 A1 | 10/2004 | Erol et al. | | 2006/0286951 A1 | 12/2006 | Nagamoto et al. |
| 2004/0215689 A1 | 10/2004 | Dooley et al. | | 2006/0294049 A1 | 12/2006 | Sechrest et al. |
| 2004/0221244 A1 | 11/2004 | Baldino | | 2007/0003147 A1 | 1/2007 | Viola et al. |
| 2004/0233235 A1 | 11/2004 | Rubin et al. | | 2007/0036469 A1 | 2/2007 | Kim et al. |
| 2004/0238621 A1 | 12/2004 | Beenau et al. | | 2007/0041668 A1 | 2/2007 | Todaka |
| 2004/0243514 A1 | 12/2004 | Wankmueller | | 2007/0052997 A1 | 3/2007 | Hull et al. |
| 2004/0260625 A1 | 12/2004 | Usami et al. | | 2007/0053513 A1 | 3/2007 | Hoffberg |
| 2004/0260680 A1 | 12/2004 | Best et al. | | 2007/0063050 A1 | 3/2007 | Attia et al. |
| 2005/0012960 A1 | 1/2005 | Eden et al. | | 2007/0106721 A1 | 5/2007 | Scholter |
| 2005/0080693 A1 | 4/2005 | Foss et al. | | 2007/0115373 A1 | 5/2007 | Gallagher et al. |
| 2005/0086188 A1 | 4/2005 | Hillis et al. | | 2007/0150466 A1 | 6/2007 | Brave et al. |
| 2005/0086224 A1 | 4/2005 | Franciosa et al. | | 2007/0165904 A1 | 7/2007 | Nudd et al. |
| 2005/0089246 A1 | 4/2005 | Luo | | 2007/0174269 A1 | 7/2007 | Jing et al. |
| 2005/0100219 A1 | 5/2005 | Berkner et al. | | 2007/0175998 A1 | 8/2007 | Lev |
| 2005/0125390 A1 | 6/2005 | Hurst-Hiller et al. | | 2007/0233613 A1 | 10/2007 | Barrus et al. |
| 2005/0135483 A1 | 6/2005 | Nair | | 2007/0242626 A1 | 10/2007 | Altberg |
| 2005/0160115 A1 | 7/2005 | Starkweather | | 2007/0271247 A1 | 11/2007 | Best et al. |
| 2005/0160258 A1* | 7/2005 | O'Shea et al. ................ 713/154 | | 2007/0276845 A1 | 11/2007 | Geilich |
| 2005/0165747 A1 | 7/2005 | Bargeron et al. | | 2008/0010605 A1 | 1/2008 | Frank |
| 2005/0165784 A1 | 7/2005 | Gomez et al. | | 2008/0037043 A1* | 2/2008 | Hull et al. ..................... 358/1.8 |
| 2005/0169520 A1 | 8/2005 | Chen et al. | | 2008/0071767 A1 | 3/2008 | Grieselhuber et al. |
| 2005/0182773 A1 | 8/2005 | Feinsmith et al. | | 2008/0071929 A1 | 3/2008 | Motte et al. |
| 2005/0185060 A1 | 8/2005 | Neven | | 2008/0106594 A1 | 5/2008 | Thurn |
| 2005/0185225 A1 | 8/2005 | Brawn et al. | | 2008/0229192 A1 | 9/2008 | Gear et al. |
| 2005/0190273 A1 | 9/2005 | Toyama et al. | | 2008/0267504 A1* | 10/2008 | Schloter et al. ............... 382/181 |
| 2005/0190972 A1 | 9/2005 | Thomas et al. | | 2008/0288476 A1* | 11/2008 | Kim et al. ........................ 707/4 |
| 2005/0198095 A1 | 9/2005 | Du et al. | | 2008/0296362 A1 | 12/2008 | Lubow |
| 2005/0216257 A1 | 9/2005 | Tanabe et al. | | 2008/0310717 A1 | 12/2008 | Saathoff et al. |
| 2005/0234851 A1 | 10/2005 | King et al. | | 2008/0317383 A1 | 12/2008 | Franz et al. |
| 2005/0240381 A1 | 10/2005 | Seiler et al. | | 2009/0152357 A1 | 6/2009 | Lei et al. |
| 2005/0261990 A1 | 11/2005 | Gocht et al. | | 2009/0235187 A1 | 9/2009 | Kim et al. |
| 2005/0273812 A1 | 12/2005 | Sakai | | 2009/0248665 A1 | 10/2009 | Garg et al. |
| 2005/0288859 A1 | 12/2005 | Golding et al. | | 2009/0254643 A1* | 10/2009 | Terheggen et al. ............ 709/223 |
| 2005/0288911 A1 | 12/2005 | Porikli | | 2009/0265761 A1* | 10/2009 | Evanitsky ........................ 726/3 |
| 2005/0289182 A1 | 12/2005 | Pandian et al. | | 2010/0013615 A1 | 1/2010 | Hebert et al. |
| 2005/0289447 A1 | 12/2005 | Hadley et al. | | 2010/0057556 A1 | 3/2010 | Rousso et al. |
| 2006/0002607 A1 | 1/2006 | Boncyk et al. | | 2010/0063961 A1 | 3/2010 | Guiheneuf et al. |
| 2006/0012677 A1 | 1/2006 | Neven et al. | | 2010/0306273 A1 | 12/2010 | Branigan et al. |
| 2006/0014317 A1 | 1/2006 | Farnworth | | 2011/0121069 A1 | 5/2011 | Lindahl et al. |
| 2006/0020630 A1 | 1/2006 | Stager et al. | | 2011/0173521 A1 | 7/2011 | Horton et al. |
| 2006/0023945 A1 | 2/2006 | King et al. | | 2012/0166435 A1 | 6/2012 | Graham |
| 2006/0026140 A1 | 2/2006 | King et al. | | 2012/0173504 A1 | 7/2012 | Moraleda |

FOREIGN PATENT DOCUMENTS

| | | | |
|---|---|---|---|
| EP | 1229496 A2 | 8/2002 |
| EP | 1555626 A2 | 7/2005 |
| EP | 1662064 A1 | 5/2006 |
| EP | 1783681 | 5/2007 |
| JP | 09-006961 | 1/1997 |
| JP | 9134372 | 5/1997 |
| JP | 10-228468 A | 8/1998 |
| JP | 10-0240765 | 9/1998 |
| JP | 11-234560 | 8/1999 |
| JP | 2000-165645 A | 6/2000 |
| JP | 200268179 | 9/2000 |
| JP | 2001211359 | 8/2001 |
| JP | 2001230916 | 8/2001 |
| JP | 2002513480 | 5/2002 |
| JP | 2003-178081 | 6/2003 |
| JP | 2005-011005 | 1/2005 |
| JP | 2005-242579 | 9/2005 |
| JP | 2005286395 | 10/2005 |
| JP | 2006053568 | 2/2006 |
| JP | 2006059351 | 3/2006 |
| JP | 2006215756 | 8/2006 |
| JP | 2007-072573 | 3/2007 |
| JP | 2007-140613 | 6/2007 |
| JP | 2007-174270 | 7/2007 |
| WO | WO 99/05658 A1 | 2/1999 |
| WO | WO 2004/072897 A2 | 8/2004 |
| WO | WO 2005/043270 A2 | 5/2005 |
| WO | W02006/092957 | 9/2006 |
| WO | 2007023994 | 3/2007 |
| WO | WO 2007/073347 A1 | 6/2007 |
| WO | 2008129373 | 10/2008 |

OTHER PUBLICATIONS

U.S. Appl. No. 10/813,901, filed Mar. 30, 2004, Erol et al.
Aggarwal, M et al, "On Cosine-fourth and Vignetting Effects in Real Lenses," ICCV Proceedings, IEEE, 2001, vol. 1, pp. 472-479, [online] Retrieved from the Internet<URL: http://www.metaverselab.org/classis/635/reading/aggarwal-iccv.pdf>.
Akenine-Moller, T. et al., "Real-Time Rendering," A.K. Peters, Natick, MA, $2^{nd}$ Edition, 2002, pp. 70-84.
Baba, M. et al., "Shadow Removal from a Real Image Based on Shadow Density," Poster at SIGGRAPH2004, Updated Aug. 16, 2004, 4 pages, [online] Retrieved from the Internet<URL:http://www.cv.its.hiroshima-cu.ac.jp/baba/Shadow/poster04-02.pdf>.
Baird, H.S., "Document Image Defect Models and Their Uses," Proc., IAPR $2^{nd}$ International Conference on Document Analysis and Recognition, Tsukuba Science City, Japan, Oct. 20-22, 1993, 7 pages.
Baird, H., "Document Image Defect Models," In Proc. of IAPR Workshop on Syntactic and Structural Pattern Recognition, Murray Hill, NJ, Jun. 1990, Structured Document Image Analysis, Springer-Verlag, pp. 546-556.
Baird, H., "The State of the Art of Document Image Degradation Modeling," In Proc. of the $4^{th}$ IAPR International Workshop on Document Analysis Systems, Rio de Janeiro, Brazil, 2000, pp. 1-16, [online] Retrieved from the Internet<URL:http://www2.parc.xerox.com/istl/members/baird/das00.pas.gz>.
Barney Smith, E.H. et al., "Text Degradations and OCR Training," International Conference on Document Analysis and Recognition 2005, Seoul, Korea, Aug. 2005, 5 pages, [online] Retrieved from the Internet<URL:http://coen.boisestate.edu/EBarneySmith/Papers/ICDAR05_submit.pdf>.
Bouget, J., "Camera Calibration Toolbox for Matlab," Online Source, Updated Jul. 24, 2006, 6 pages, [online] Retrieved from the Internet<URL:http:www.vision.caltech.edu/bougetj/calib_doc/index.html#ref>.
Boukraa, M. et al., "Tag-Based Vision: Assisting 3D Scene Analysis with Radio-Frequency Tags," Jul. 8, 2002, Proceedings of the Fifth International Conference on Information Fusion, Piscataway, N.J., IEEE, Jul. 8-11, 2002, pp. 412-418.
Boyd, S., "EE263: Introduction to Linear Dynamical Systems," Online Lecture Notes, Stanford University, Spring Quarter, 2006-2007, Accessed on Sep. 11, 2006, 4 pages, [online] Retrieved from the Internet<URL:http://www.standford/edu/class/ee263/#lectures>.
Brassil, J. et al., "Hiding Information in Document Images," Proc. Conf. Information Sciences and Systems (CISS-95), Mar. 1995, Johns Hopkins University, Baltimore, MD, pp. 482-489.
"Call for Papers: ICAT 2007," $17^{th}$ International Conference on Artificial Reality and Telexistence, 2007, [Online] [Retrieved on Nov. 4, 2008] Retrieved from the Internet<URL:http://www.idemployee.id.tue.nl/g.w.m.rauterberg/conferences/ICAT2007-CfP.pdf>.
Constantini, R. et al., "Virtual Sensor Design," Proceedings of the SPIE, vol. 5301, 2004, pp. 408-419, Retrieved from the Internet<URL:http://ivrgwww.epfl.ch/publications/cs04.pdf>.
Cover, T.M. et al., "Nearest Neighbor Pattern Classification," IEEE Transactions on Information Theory, Jan. 1967, pp. 21-27, vol. IT-13, No. 1.
Davis, M. et al., "Towards Context-Aware Face Recognition," Proceedings of the 13th Annual ACM International Conference on Multimedia, Nov. 6-11, 2005, pp. 483-486, vol. 13.
Doermann, D. et al., "Progress in Camera-Based Document Image Analysis," Proceedings of the Seventh International Conference on Document Analysis and Recognition, ICDAR 2003, 11 pages, [online] Retrieved from the Internet<URL:http://www.cse.salford.ac.uk/prima/ICDAR2003/Papers/0111_keynote_111_doermann_d.pdf>.
Erol, B. et al., "Linking Multimedia Presentations with Their Symbolic Source Documents: Algorithm and Applications," Nov. 2-8, 2003, pp. 498-507, [Online] [Retreived on Oct. 15, 2008] Retrieved from the Internet<URL:http://rii.ricoh.com/{hull/pubs/p225_erol.pdf>.
Esposito, F. et al., "Machine Learning Methods for Automatically Processing Historical Documents: from Paper Acquisition to XML Transformation," Proceedings of the First International Workshop on Document Image Analysis for Libraries (DIAL '04), IEEE, 2004, pp. 1-8.
European Partial Search Report, European Application No. EP07015093.3, Dec. 17, 2007, 7 pages.
European Search Report, European Application No. 08160125.4, Oct. 13, 2008, 5 pages.
European Search Report, European Application No. 06796845.3, Oct. 30, 2008, 12 pages.
European Search Report, European Application No. 06796844.6, Oct. 30, 2008, 12 pages.
European Search Report, European Application No. 06796848.7, Oct. 31, 2008, 12 pages.
European Search Report, European Application No. 06796846.1, Nov. 5, 2008, 11 pages.
European Search Report, European Application No. 08159971.4, Nov. 14, 2008, 6 pages.
European Search Report, European Application No. 08160115.5, Nov. 12, 2008, 6 pages.
European Search Report, European Application No. 08160130.4, Nov. 12, 2008, 7 pages.
European Search Report, European Application No. 08160112.2, Nov. 10, 2008, 7 pages.
European Search Report, European Application No. 07252397, Oct. 15, 2007, 7 pages.
Ho, T.K. et al., "Decision Combination in Multiple Classifier Systems," IEEE Transactions on Pattern Analysis and Machine Intelligence, Jan. 1994, pp. 66-75, vol. 16, No. 1.
Ho, T.K. et al., "Evaluation of OCT Accuracy Using Synthetic Data," Proceedings of the $4^{th}$ Annual Symposium on Document Analysis and Information Retrieval, Apr. 24-26, 1995, pp. 413-422. [online] Retrieved from the Internet<URL:http://citeseer.ist.psu.edu/cache/papers/cs/2303/http:zSzzSzcm.bell-labs.comzSzcmzSzcszSzwhozSzhsbzSzeoasd.pdf/ho95evaluation.pdf>.
Hull, J.J., "Document Image Matching and Retrieval with Multiple Distortion-Invariant Descriptors," International Association for Pattern Recognition Workshop on Document Analysis Systems, Jan. 1, 1995, pp. 375-396.

Hull, J.J. et al., "Document Image Matching Techniques," Apr. 30, 1997, pp. 31-35, [Online] [Retrieved on May 2, 1997] Retrieved from the Internet<URL:http://rii.ricoch.com/hull/pubs/hull_sdiut97.pdf>.

Hull, J. J., "Document Image Similarity and Equivalence Detection," International Journal on Document Analysis and Recognition, 1998, pp. 37-42, Springer-Verlag.

Hull, J., "Document Image Skew Detection: Survey and Annotated Bibliography," Document Analysis Systems II, World Scientific, 1998, pp. 40-64.

Kanungo, T. et al., "A Downhill Simplex Algorithm for Estimating Morphological Degradation Model Parameters," University of Maryland Technical Report, LAMP-RT-066, Feb. 2001, 15 pages, [online] Retrieved from the Internet<URL:http://lampsrv01.umiacs.umd.edu/pubs/TechReports/LAMP_066/LAMP_066.pdf>.

Kanungo, T. et al., "Global and Local Document Degradation Models," Document Analysis and Recognition, 1993, Proceedings of the Second International Conference on Volume, Oct. 20-22, 1993, pp. 730-734.

Khoubyari, S. et al., "Font and Funct on Word Ident ficat on n Document Recogn t on," Computer Vision and Image Understanding, Jan. 1996, pp. 66-74, vol. 63, No. 1.

Khoubyari, S. et al., "Keyword Location and Noisy Document Images," Second Annual Symposium on Document Analysis and Information Retrieval, Las Vegas, NV, Apr. 26-28, 1993, pp. 217-231.

Kopec, G.E. et al., "Document Image Decoding Using Markov Source Models," IEEE Transactions on Pattern Analysis and Machine Intelligence, Jun. 1994, pp. 602-617, vol. 16, No. 6.

Li, Y. et al., "Validation of Image Defect Models for Optical Character Recognition," IEEE Trans. Pattern Anal. Mach. Intell. 18, 2, Feb. 1996, pp. 99-108, [online] Retrieved from the Internet<URL:http://www.cs.cmu.edu/afs/cs/usr/andrewt/papers/Validate/journal.ps.gz>.

Liang, J. et al., "Flattening Curved Documents in Images," In Proc. of the IEEE Conf. on Computer Vision and Pattern Recognition (CVPR), 2005, 8 pages, [online] Retrieved from the Internet<URL:http://www.cfar.umd.edu/~daniel/daniel_papersfordownload/liang-j_cpvr2005.pdf>.

Lu, Y. et al., "Document Retrieval from Compressed Images," Pattern Recognition, 2003, pp. 987-996, vol. 36.

McDonald, G., "Third Voice: Invisible Web Graffiti," PC World, May 18, 1999, [online] [Retrieved on Nov. 14, 2006] Retrieved from the Internet<URL:http://www.pcworld.com/news/article/0,aid,11016,00.asp>.

Microsoft Computer Dictionary (5th ed.), 2002, "Hyperlink" Definition, pp. 260-261.

"Mobile Search Engines," Sonera MediaLab, Nov. 15, 2002, pp. 1-12.

Mukherjea, S. et al., "AMORE: A World Wide Web Image Retrieval Engine," C&C Research Laboratories, NEC USA Inc., Baltzer Science Publishers BV, World Wide Web 2, 1999, pp. 115-132.

Pavlidis, T., "Effects of Distortions on the Recognition Rate of a Structural OCR System," In Pro. Conf. on Comp. Vision and Pattern Recog., IEEE, Washington, DC, 1983, pp. 303-309.

PCT International Search Report and Written Opinion, PCT/JP2006/316810, Oct. 10, 2006, 9 pages.

PCT International Search Report and Written Opinion, PCT/JP2006/316811, Oct. 10, 2006, 9 pages.

PCT International Search Report and Written Opinion, PCT/JP2006/316812, Oct. 10, 2006, 9 pages.

PCT International Search Report and Written Opinion, PCT/JP2006/316814, Oct. 10, 2006, 11 pages.

Sato, T. et al., "High Resolution Video Mosaicing for Documents and Photos by Estimating Camera Motion," Proceedings of the SPIE 5299, 246, 2004, 8 pages, [online] Retrieved from the Internet<URL:http://yokoya.naist.jp/paper/datas/711/spie2004.pdf>.

Schalkoff, R.J., "Syntactic Pattern Recognition (SYNTPR) Overview," Pattern Recognition: Statistical, Structural and Neural Approaces, Jan. 1, 1992, pp. 127-150, vol. 3, Wiley.

Sivic, J. et al., "Video Google: A Text Retrieval Approach to Object Matching in Videos," Proceedings of the Ninth IEEE International Conference on Computer Vision (ICCV 2003), 2-Volume Set, 2003, IEEE, pp. 1-8.

Stoyanov, D., "Camera Calibration Tools," Online Source, Updated Aug. 24, 2006, Accessed Aug. 31, 2006, 12 pages, [online] Retrieved from the Internet<URL:http://ubimon.doc.ic.ac.uk/dvs/index.php?m=581>.

Veltkamp, R. et al., "Content-Based Image Retrieval Systems: A Survey," Department of Computing Science, Utrecht University, Oct. 28, 2002, pp. 1-62.

Wikipedia Online Definition, "Optical Character Recognition," Sep. 14, 2008, pp. 1-7, [online] [Retrieved on Sep. 14, 2008] Retrieved from the Internet<URL:http://en.wikipedia.org/wiki/Optical_character_recognition>.

Wikipedia Online Encyclopedia, "Automatic Identification and Data Capture," Jul. 21, 2008, pp. 1-2, [Online] [Retrieved on Sep. 27, 2008] Retrieved from the Internet<URL:http://en.wikipedia.org/wiki/Automatic_identification_and_data_capture>.

Zhang, Z., "A Flexible New Technique for Camera Calibration," IEEE Transactions on Pattern Analysis and Machine Intelligence, Nov. 2000, pp. 1330-1334, vol. 22, No. 11.

Zheng, Q.-F. et al., "Effective and Efficient Object-Based Image Retrieval Using Visual Phases," Proceedings of the 14th Annual ACM International Conference on Multimedia, MM'06, Oct. 23-27, 2006, Santa Barbara, CA, pp. 77-80.

Zi, G., "Groundtruth Generation and Document Image Degradation," University of Maryland Language and Media Processing Laboratory Technical report (LAMP-TR-121), May 2005, 72 pages, [online] Retrieved from the Internet<URL:http://lampsrv01.umiacs.umd.edu/pubs/TechReports/LAMP_121/LAMP_121.pdf>=.

U.S. Office Action, U.S. Appl. No. 11/776,520, Dec. 7, 2010, 43 pages.

U.S. Office Action, U.S. Appl. No. 12/719,437, Dec. 9, 2010, 38 pages.

U.S. Office Action, U.S. Appl. No. 11/776,510, Dec. 10, 2010, 39 pages.

U.S. Office Action, U.S. Appl. No. 11/461,126, Dec. 23, 2010, 30 pages.

U.S. Office Action, U.S. Appl. No. 11/461,279, Jan. 7, 2011, 44 pages.

U.S. Office Action, U.S. Appl. No. 12/240,596, Jan. 21, 2011, 21 pages.

U.S. Office Action, U.S. Appl. No. 11/461,286, Jan. 21, 2011, 34 pages.

U.S. Office Action, U.S. Appl. No. 11/461,143, Feb. 4, 2011, 16 pages.

European Search Report, European Application No. 09170045.0, Nov. 24, 2009, 4 pages.

Roth, M.T. et al., "The Garlic Project," Proc. of the 1996 ACM SIGMOD International Conference on Management of Data, Montreal, Quebec, Canada, Jun. 4, 1996, pp. 557.

Archive of Scanbuy Solutions | Optical Intelligence for your Mobile Devices, Scanbuy® Inc., www.scanbuy.com/website/solutions_summary.htm, [Online] [Archived by http://archive.org on Jun. 19, 2006; Retrieved on Mar. 3, 2009] Retrieved from the Internet<URL:http://web.archive.org/web/20060619172549/http://www.scanbuy.com/website/solutions_su...>.

Canny, J., "A Computational Approach to Edge Detection," IEEE Transactions on Pattern Analysis and Machine Intelligence, Nov. 1986, pp. 679-714, vol. PAMI-8, No. 6.

Di Stefano, L. et al., "A Simple and Efficient Connected Components Labeling Algorithm," International Conference on Image Analysis and Processing, 1999, pp. 322-327.

Duda, R. O. et al., "Use of the Hough Transformation to Detect Lines and Curves in Pictures," Communications of the ACM, Jan. 1972, pp. 11-15, vol. 15, No. 1.

Erol, B. et al., "Prescient Paper: Multimedia Document Creation with Document Image Matching," 17th International Conference on Pattern Recognition, Aug. 23-26, 2004, Cambridge, UK.

Erol, B. et al., "Retrieval of Presentation Recordings with Digital Camera Images," IEEE Conference on Computer Vision and Pattern Recognition, Jun. 27-Jul. 2, 2004.

Ezaki, N. et al., "Text Detection from Natural Scene Images: Towards a System for Visually Impaired Persons," Proc. of 17th Int. Conf. on Pattern Recognition (ICPR 2004), IEEE Computer Society, Aug. 23-26, 2004, Cambridge, UK, pp. 683-686, vol. II.

Fadoua, D. et al., "Restoring Ink Bleed-Through Degraded Document Images Using a Recursive Unsupervised Classification Technique," Lecture Notes in Computer Science 3872, Document Analysis Systems VII, 7th International Workshop, DAS 2006, Feb. 13-15, 2006, Nelson, New Zealand, Bunke, H. et al. (eds.), pp. 38-49.

Freund, Y. et al., "A Short Introduction to Boosting," Journal of Japanese Society for Artificial Intelligence, Sep. 1999, pp. 771-780, vol. 14, No. 5.

Hjelmas, E. et al., "Face Detection: A Survey," Computer Vision and Image Understanding, 2001, pp. 236-274, vol. 83.

Hull, J.J., "Document Image Matching on CCITT Group 4 Compressed Images," SPIE Conference on Document Recognition IV, Feb. 8, 1997, pp. 82-87.

Jagannathan, L. et al., Perspective Correction Methods for Camera Based Document Analysis, Proc. First Int. Workshop on Camera-based Document Analysis and Recognition, 2005, pp. 148-154.

Jain, A.K. et al., "An Introduction to Biometric Recognition," IEEE Transactions on Circuits and Systems for Video Technology, Jan. 2004, pp. 4-20, vol. 14, No. 1.

Po, L-M. et al., "A Novel Four-Step Search Algorithm for Fast Block Motion Estimation," IEEE Transactions on Circuits and Systems for Video Technology, Jun. 1996, pp. 313-317, vol. 6, Issue 3.

Rangarajan, K. et al. "Optimal Corner Detector," 1988, IEEE, pp. 90-94.

Rosin, P.L. et al., "Image Difference Threshold Strategies and Shadow Detection," Proceedings of the 6th British Machine Vision Conference, 1995,10 pages.

Sezgin, M. et al., "Survey Over Image Thresholding Techniques and Quantitative Performance Evaluation," Journal of Electronic Imaging, Jan. 2004, pp. 146-165, vol. 13, No. 1.

Triantafyllidis, G.A. et al., "Detection of Blocking Artifacts of Compressed Still Images," Proceedings of the 11th International Conference on Image Analysis and Processing (ICIAP '01), IEEE, 2001, pp. 1-5.

U.S. Appl. No. 10/696,735, filed Oct. 28, 2003, Erol, B. et al., "Techniques for Using a Captured Image for the Retrieval of Recorded Information," 58 pages.

Zanibbi, R. et al. "A Survey of Table Recognition," International Journal on Document Analysis and Recognition, 2004, pp. 1-33.

Zhao, W. et al., Face Recognition: A Literature Survey, ACM Computing Surveys (CSUR), 2003, pp. 399-458, vol. 35, No. 4.

Liu, Y. et al., "Automatic Texture Segmentation for Texture-Based Image Retrieval," IEEE, Jan. 5-7, 2004, pp. 285-288.

Liu, T. et al., "A Fast Image Segmentation Algorithm for Interactive Video Hotspot Retrieval," IEEE, 2001, pp. 3-8.

Wikipedia Online Encyclopedia, "Image Scanner," Last Modified Feb. 9, 2010, pp. 1-9, [Online] [Retrieved on Feb. 13, 2010] Retrieved from the Internet<URL:http://en.wikipedia.org/wiki/Image_scanner>.

Wikipedia Online Encyclopedia, "Waypoint," Last Modified Feb. 13, 2010, pp. 1-4, [Online] Retrieved on Feb. 13, 2010] Retrieved from the Internet<URL:http://en.wikipedia.org/wiki/Waypoint>.

Erol, B. et al., "Linking Presentation Documents Using Image Analysis," IEEE, Nov. 9-12, 2003, pp. 97-101, vol. 1.

Hull, J.J. et al., "Visualizing Multimedia Content on Paper Documents: Components of Key Frame Selection for Video Paper," Proceedings of the Seventh International Conference on Document Analysis and Recognition (ICDAR'03), IEEE, 2003, 4 pages.

United States Office Action, U.S. Appl. No. 11/624,466, Jun. 8, 2010, 29 pages.

United States Office Action, U.S. Appl. No. 11/827,530, Jun. 9, 2010, 35 pages.

United States Office Action, U.S. Appl. No. 11/461,294, Jun. 11, 2010, 19 pages.

United States Office Action, U.S. Appl. No. 11/461,300, Jun. 11, 2010, 20 pages.

United States Office Action, U.S. Appl. No. 11/461,024, Jul. 14, 2010, 29 pages.

United States Office Action, U.S. Appl. No. 11/461,049, Jul. 28, 2010, 27 pages.

United States Office Action, U.S. Appl. No. 11/461,279, Aug. 5, 2010, 37 pages.

United States Office Action, U.S. Appl. No. 11/461,286, Aug. 5, 2010, 28 pages.

United States Office Action, U.S. Appl. No. 12/240,596, Aug. 6, 2010, 32 pages.

Archive of "Barcodepedia.com—the online barcode database," [online] [Archived by http://archive.org on Jul. 9, 2006; Retrieved on Aug. 18, 2008] Retrieved from the Internet<http://web.archive.org/web/20060709101455/http://en.barcodepedia.com/>.

Hull, J.J. et al., "Paper-Based Augmented Reality," 17th International Conference on Artificial Reality and Telexistence, 2007, IEEE [online] [Retrieved on Aug. 19, 2008] Retrieved from the Internet<URL:http://www.crc.ricoh.com/~hull/pubs/hull_icat07.pdf>.

"Mobile Video Managed Service," Vidiator, 2008, [online] [Retrieved on Aug. 29, 2008] Retrieved from the Internet<URL:http://www.vidiator.com/services/managed_mobile_video.aspx>.

European Search Report, European Application No. 09156089.6, Jun. 19, 2009, 8 pages.

Marques, O. et al., "Content-Based Image and Video Retrieval, Video Content Representation, Indexing, and Retrieval, a Survey of Content-Based Image Retrieval Systems, CBVQ (Content-Based Visual Query)," Content-Based Image and Video Retrieval [Multimedia Systems and Applications Series], Apr. 1, 2002, pp. 15-117, vol. 21, Kluwer Academic Publishers Group, Boston, USA.

Japanese Office Action, Japanese Application No. 2004-293962, Aug. 24, 2010, 3 pages.

Extended European Search Report, Application No. 09178280.5-2201/2202646, Aug. 31, 2010, 6 pages.

United States Office Action, U.S. Appl. No. 11/461,143, Aug. 18, 2010, 9 pages.

United States Office Action, U.S. Appl. No. 11/461,272, Aug. 23, 2010, 31 pages.

United States Office Action, U.S. Appl. No. 11/461,126, Sep. 3, 2010, 28 pages.

United States Notice of Allowance, U.S. Appl. No. 11/461,095, Sep. 27, 2010, 29 pages.

United States Office Action, U.S. Appl. No. 12/060,194, Oct. 1, 2010, 29 pages.

United States Office Action, U.S. Appl. No. 11/461,294, Oct. 7, 2010, 17 pages.

United States Office Action, U.S. Appl. No. 11/461,300, Oct. 6, 2010, 20 pages.

United States Office Action, U.S. Appl. No. 11/827,530, Oct. 7, 2010, 21 pages.

United States Office Action, U.S. Appl. No. 11/624,466, Oct. 14, 2010, 11 pages.

United States Notice of Allowance, U.S. Appl. No. 11/461,091, Oct. 18, 2010, 31 pages.

United States Notice of Allowance, U.S. Appl. No. 11/461,024, Nov. 15, 2010, 10 pages.

United States Notice of Allowance, U.S. Appl. No. 11/461,049, Nov. 16, 2010, 10 pages.

United States Notice of Allowability, U.S. Appl. No. 11/461,091, Nov. 17, 2010, 22 pages.

United States Office Action, U.S. Appl. No. 11/777,142, Nov. 10, 2010, 17 pages.

Japanese Office Action, Japanese Patent Application No. 200910138044.X, Jan. 26, 2011, 6 pages.

U.S. Notice of Allowance, U.S. Appl. No. 11/624,466, Feb. 22, 2011, 12 pages.

U.S. Notice of Allowance, U.S. Appl. No. 11/461,272, Feb. 23, 2011, 28 pages.

U.S. Office Action, U.S. Appl. No. 12/060,194, Feb. 25, 2011, 18 pages.

U.S. Office Action, U.S. Appl. No. 12/879,933, Mar. 2, 2011, 7 pages.

U.S. Office Action, U.S. Appl. No. 12/210,519, Mar. 14, 2011, 38 pages.

U.S. Notice of Allowance, U.S. Appl. No. 11/461,024, Mar. 16, 2011, 12 pages.

U.S. Office Action, U.S. Appl. No. 11/461,300, Mar. 18, 2011, 25 pages.

U.S. Office Action, U.S. Appl. No. 11/777,142, Mar. 18, 2011, 21 pages.
U.S. Office Action, U.S. Appl. No. 11/461,037, Mar. 30, 2011, 29 pages.
U.S. Office Action, U.S. Appl. No. 12/210,511, Apr. 4, 2011, 49 pages.
U.S. Office Action, U.S. Appl. No. 12/247,202, Apr. 6, 2011, 37 pages.
U.S. Office Action, U.S. Appl. No. 11/461,126, Apr. 12, 2011, 27 pages.
U.S. Office Action, U.S. Appl. No. 11/461,294, Apr. 12, 2011, 23 pages.
U.S. Office Action, U.S. Appl. No. 12/210,540, Apr. 15, 2011, 45 pages.
U.S. Office Action, U.S. Appl. No. 12/340,124, Apr. 15, 2011, 48 pages.
Antonacopoulos et al., "Flexible Page Segmentation Using the Background", Proceedings of the IAPR International Conference on Pattern Recognition, Jerusalem, Oct. 9-13, 1994. Conference B: Pattern Recognition and Neural Networks; [Proceedings of the IAPR International Conference on Pattern Recognition], Los Alamitos, IEE, vol. 2, Oct. 9, 1994, pp. 339-344, XP000509905, ISBN: 978-0-8186-6272-0.
Reniers et al., "Skeleton-based Hierarchical Shape Segmentation", IEEE International Conference on Shape Modeling and Applications. SMI'07, Jun. 1, 2007, Computer Society, pp. 179-188, XP031116745, ISBN: 978-0-7695-2815-1.
Rademacher, "View-Dependent Geometry", Computer Graphics Proceedings, Annual Conference Series, SIGGRAPH 99, Los Angeles, California Aug. 8-13, 1999, pp. 439-446, XP001024743.
U.S. Patent Office Action, U.S. Appl. No. 11/776,520, Apr. 28, 2011, 10 pages.
Extended European Search Report, European Patent Application No. 082523770, May 2, 2011, 6 pages.
U.S. Patent Office Action, U.S. Appl. No. 11/776,510, May 12, 2011, 20 pages.
U.S. Patent Office Action, U.S. Appl. No. 12/210,519, Jun. 16, 2011, 22 pages.
U.S. Patent Office Action, U.S. Appl. No. 12/060,194, Jun. 27, 2011, 18 pages.
Mae et al., "Object Recognition Using Appearance Models Accumulated into Environment", Proc. 15-th Intl. Conf. on Pattern Recognition, 2000, vol. 4, pp. 845-848.
EPO Summons for Oral Proceedings, European Patent Application No. 07015093.3, Sep. 16, 2011, 4 pages.
Japanese Office Action, Japanese Patent Application No. 2008-008112, Oct. 25, 2011, 3 pages.
Adobe Acrobat Advanced Elements (for both PC and Mac Computers), 2002, pp. 1-19.
U.S. Office Action, U.S. Appl. No. 12/210,540, Oct. 14, 2011, 22 pages.
U.S. Office Action, U.S. Appl. No. 12/265,502, Oct. 14, 2011, 61 pages.
U.S. Office Action, U.S. Appl. No. 11/776,520, Oct. 17, 2011, 19 pages.
U.S. Office Action, U.S. Appl. No. 12/340,124, Oct. 24, 2011, 31 pages.
U.S. Office Action, U.S. Appl. No. 11/827,530, Oct. 28, 2011, 43 pages.
U.S. Office Action, U.S. Appl. No. 12/879,933, Oct. 28, 2011, 36 pages.
U.S. Office Action, U.S. Appl. No. 12/210,532, Oct. 31, 2011, 61 pages.
U.S. Office Action, U.S. Appl. No. 11/461,037, Nov. 23, 2011, 33 pages.
U.S. Notice of Allowance, U.S. Appl. No. 12/060,194, Nov. 28, 2011, 23 pages.
U.S. Office Action, U.S. Appl. No. 11/461,126, Dec. 1, 2011, 53 pages.
U.S. Notice of Allowance, U.S. Appl. No. 11/461,143, Dec. 5, 2011, 15 pages.
United States Office Action, U.S. Appl. No. 11/461,279, Jul. 8, 2011, 46 pages.
United States Office Action, U.S. Appl. No. 11/461,286, Jul. 15, 2011, 37 pages.
United States Office Action, U.S. Appl. No. 11/461,126, Jul. 22, 2011, 35 pages.
United States Notice of Allowance, U.S. Appl. No. 12/247,202, Jul. 28, 2011, 16 pages.
United States Office Action, U.S. Appl. No. 11/461,143, Aug. 11, 2011, 20 pages.
United States Office Action, U.S. Appl. No. 11/776,530, Aug. 19, 2011, 54 pages.
United States Office Action, U.S. Appl. No. 12/253,715, Aug. 31, 2011, 58 pages.
United States Office Action, U.S. Appl. No. 12/060,198, Sep. 1, 2011, 87 pages.
United States Office Action, U.S. Appl. No. 12/060,200, Sep. 2, 2011, 65 pages.
United States Notice of Allowance, U.S. Appl. No. 11/776,510, Sep. 22, 2011, 11 pages.
United States Office Action, U.S. Appl. No. 11/777,142, Sep. 23, 2011, 22 pages.
United States Office Action, U.S. Appl. No. 12/210,511, Sep. 28, 2011, 25 pages.
United States Office Action, U.S. Appl. No. 12/247,205, Oct. 6, 2011, 56 pages.
United States Office Action, U.S. Appl. No. 12/342,330, Oct. 7, 2011, 47 pages.
United States Final Office Action, U.S. Appl. No. 12/247,205, dated May 23, 2012, 50 pages.
United States Final Office Action, U.S. Appl. No. 12/210,532, dated Jun. 5, 2012, 48 pages.
United States Non-Final Office Action, U.S. Appl. No. 11/461,037, dated Jun. 13, 2012, 46 pages.
United States Non-Final Office Action, U.S. Appl. No. 12/340,124, dated Jun. 27, 2012, 31 pages.
United States Final Office Action, U.S. Appl. No. 12/210,519, dated Jun. 28, 2012, 33 pages.
United States Final Office Action, U.S. Appl. No. 12/491,018, dated Jun. 28, 2012, 64 pages.
United States Final Office Action, U.S. Appl. No. 11/461,300, dated Jul. 13, 2012, 33 pages.
United States Notice of Allowance, U.S. Appl. No. 11/461,294, dated Aug. 9, 2012, 33 pages.
United States Final Office Action, U.S. Appl. No. 11/461,279, dated Aug. 10, 2012, 50 pages.
United States Notice of Allowance, U.S. Appl. No. 11/461,286, dated Aug. 14, 2012, 42 pages.
United States Final Office Action, U.S. Appl. No. 12/240,596, dated Jun. 14, 2012, 28 pages.
Hirokazu Kate et al., A Registration Method for Augmented Reality based on Matching Templates Generated from Texture Image, Transaction for the Virtual Reality Society of Japan, The Virtual Reality Society of Japan, 2002, vol. 7, No. 2, pp. 119-128.
Japanese Office Action, JP2008-180790, dated May 22, 2012, 3 pages.
Japanese Office Action, JP2008-180791, dated May 22, 2012, 4 pages.
Japanese Office Action, JP2008-180792, dated May 22, 2012, 3 pages.
Japanese Office Action, JP2008-180793, dated May 29, 2012, 3 pages.
Japanese Office Action, JP2008-180794, dated May 22, 2012, 3 pages.
United States Final Office Action, U.S. Appl. No. 12/719,437, Mar. 1, 2012, 518 pages.
United States Notice of Allowance, U.S. Appl. No. 11/461,126, Mar. 5, 2012, 19 pages.
United States Notice of Allowance, U.S. Appl. No. 11/461,143, Mar. 8, 2012, 9 pages.
United States Notice of Allowance, U.S. Appl. No. 11/776,530, Mar. 26, 2012, 5 pages.
United States Non-Final Office Action, U.S. Appl. No. 12/240,590, Apr. 4, 2012, 73 pages.

United States Notice of Allowance, U.S. Appl. No. 13/168,638, Apr. 4, 2012, 30 pages.
United States Final Office Action, U.S. Appl. No. 12/265,502, Apr. 5, 2012, 49 pages.
United States Final Office Action, U.S. Appl. No. 12/060,198, Apr. 12, 2012, 74 pages.
United States Final Office Action, U.S. Appl. No. 12/060,200, Apr. 12, 2012, 65 pages.
United States Final Office Action, U.S. Appl. No. 11/461,294, Apr. 13, 2012, 23 pages.
United States Final Office Action, U.S. Appl. No. 11/461,286, Apr. 16, 2012, 47 pages.
United States Non-Final Office Action, U.S. Appl. No. 11/461,279, Apr. 19, 2012, 59 pages.
United States Notice of Allowance, U.S. Appl. No. 11/827,530, Apr. 24, 2012, 21 pages.
Yanagisawa Kiyoshi, "Access Control Management System using Face Recognition Technology" Nippon Signal Technical Journal, Japan, The Nippon Signal Co., Ltd., Mar. 1, 2002, vol. 26, No. 1, 9 pages (pp. 21-26).
Japan Patent Office, Office Action for Japanese Patent Application JP2007-199984, Mar. 13, 2012, 3 pages.
China Patent Office, Office Action for Chinese Patent Application CN200680039376.7, Apr. 28, 2012, 11 pages.
U.S. Office Action, U.S. Appl. No. 12/059,583, dated Sep. 10, 2012, 41 pages.
U.S. Notice of Allowance, U.S. Appl. No. 12/240,590, dated Oct. 1, 2012, 19 pages.
U.S. Notice of Allowance, U.S. Appl. No. 12/491,018, dated Oct. 11, 2012, 13 pages.
U.S. Office Action, U.S. Appl. No. 13/192,458, dated Oct. 11, 2012, 30 pages.
U.S. Office Action, U.S. Appl. No. 13/415,756, dated Oct. 26, 2012, 40 pages.
U.S. Office Action, U.S. Appl. No. 12/253,715, dated Nov. 14, 2012, 76 pages.
U.S. Office Action, U.S. Appl. No. 11/461,300, dated Nov. 28, 2012, 37 pages.
U.S. Office Action, U.S. Appl. No. 13/415,228, dated Dec. 3, 2012, 38 pages.
JP Office Action, JP Application No. 2008-180789, dated Sep. 25, 2012, 3 pages.
Tomohiro Nakai; Document Image Retrieval Based on Cross-Ration and Hashing IEICE Technical Report; The Institute of Electronics, Information and Communication Engineers; dated Mar. 11, 2005; vol. 104 No. 742; pp. 103-108.

* cited by examiner

```
//TAKE A SNAPSHOT, draw the movieclip into the bitmapdata object object with the scaled
                              transformation matrix
snapshot.draw(capturePreview.my_video,m)
hor_edge_count=0
ver_edge_count=0
step=10
div=160
text_threshold=50
edge_threshold=90

//horizontal gradient
for(var j=step;j<videoheight-step-1;j+=step)
{
        for(var i=step;i<videowidth-step-1;i+=step)
        {
                pixval1=snapshot.getPixel(i-1, j);
                pixval2=snapshot.getPixel(i+1, j);
val=((pixval1&0x000000FF)+((pixval1&0x00FF0000)>>16)+((pixval1&0x0000FF00)>>8))-
((pixval2&0x000000FF)+((pixval2&0x00FF0000)>>16)+((pixval2&0x0000FF00)>>8));
                if (val> edge_threshold || val<-edge_threshold)
                        hor_edge_count++;
        }
}

//vertical gradient
for(var i=step;i<videowidth-step-1;i+=step)
{
        for(var j=step;j<videoheight-step-1;j+=step)
        {
                pixval1=snapshot.getPixel(i, j-1);
                pixval2=snapshot.getPixel(i, j+1);
val=((pixval1&0x000000FF)+((pixval1&0x00FF0000)>>16)+((pixval1&0x0000FF00)>>8))-
((pixval2&0x000000FF)+((pixval2&0x00FF0000)>>16)+((pixval2&0x0000FF00)>>8));
                if (val>edge_threshold || val<-edge_threshold)
                        ver_edge_count++;
        }
}
edgequantity=(hor_edge_count*ver_edge_count)/div;
if (edgequantity<1) edgequantity=1;
if (edgequantity>100) edgequantity=100;

if (sending_done)
{
        if (edgequantity>text_threshold)
        {
                //attach the bitmap inside the holder movie clip
                sentImage=snapshot.clone();
                sentImageHolder.attachBitmap(sentImage,1)
                sendquery();
        }
}
```

FIG. 9

WEB-BASED CONTENT DETECTION IN IMAGES, EXTRACTION AND RECOGNITION

BACKGROUND OF THE INVENTION

1. Field of the Invention

The present invention relates to processing techniques for content detection in images, extraction and recognition. More particularly, the present invention relates to systems and methods for using a web browser plug-in for content detection in images and image frame extraction to generate input for content recognition.

2. Description of the Related Art

Computers and electronic documents are restricted to use in environments where electronic documents are manipulated using computers and output by the computer to printers and printed on paper. Once an electronic document is printed out on paper, manipulations on the paper version and the electronic version of the document are independent. Printing and copying technology has not been able to bridge the gap between static printed media (i.e., paper documents), and the dynamic electronic media that includes the likes of digital communication, networking, electronic information dissemination, electronic advertising, on-line entertainment and electronic commerce.

The advent and ever-increasing popularity of smaller portable computing devices and personal electronic devices, such as personal digital assistant (PDA) devices, cellular telephones (e.g., cellular camera phones) and digital cameras over the past few years, has expanded the concept of documents to include their electronic version by making the available in an electronically readable and searchable form and by introducing interactive multimedia capabilities, which are unparalleled by traditional printed media.

There continue to be problems in the prior art in bridging the gap between the world of electronic documents on one hand and the world of paper documents on the other. In particular, it is still very difficult and/or computationally expensive to use a printed document to access or even find the electronic document from which the paper document was generated. A key obstacle to identifying and finding an electronic document corresponding to a printed document is the conversion of the printed document to electronic form that can be used for matching the paper document to electronic document. While capturing an image of the printed document has become trivial with the proliferation of cell phones with cameras or scanners, there is no way to use such low quality images for electronic document retrieval. Even when the image is high quality, the computations necessary for recognition can be significant and inaccurate.

One particular problem with the prior art is that the few types of recognition available require application specific recognition/communication software to be installed on the client device prior to runtime.

Yet another problem with the prior art that there are no methods to effectively interface the electronic world using a combination of paper and everyday computing devices. There are a variety of mechanisms such as tool bars, button and other interfaces that can be displayed on a computer screen alone and that are used with input devices like mouse-type controllers and keyboards. However, there is no such interface for working with paper or other tangible media and electronic documents at the same time.

SUMMARY OF THE INVENTION

The present invention overcomes the deficiencies of the prior art with a system for web-based content detection in images and image extraction via a browser plug-in. The system is advantageous because it performs initial image processing at a client to determine whether an image is suitable for a recognition process and extracts an image frame for processing. The client-side processing is advantageously via a web browser plug-in or other lightweight program that does not require installation on the client. Installation, as used herein, means storing the plug-in or other lightweight program in persistent storage at the client and/or modification to a registry. In one embodiment, the plug-in performs initial image analysis for detection and frame extraction, and reserves compute-intense recognition processes for the server. In one embodiment, the system of the present invention includes: an image capture device, a web browser, a plug-in, and a recognition server. The plug-in further comprises modules for controlling image capture, analysis, and transmission to the recognition server. A captured image is processed by the plug-in to assess whether a pre-determined content type is contained with in the image, e.g., whether the image is of document text. The system thus enables users to link documents or other image types to electronic data using a capture device and a web browser.

The present invention also includes methods for using web-based image content type detection. Once an initial analysis at the browser plug-in detects a pre-determined content type in an image, the image is transmitted to a recognition server for content recognition. For example, if the initial analysis determines that the image include document text, the image is transmitted to a recognition server for document recognition. Document recognition can advantageously be used in conjunction with various document sources such as document servers or local storage (e.g., hard drive of the client). The user is advantageously provided access to document recognition with any Internet-enabled client device without the need to install any software to the client device. At runtime, the plug-in can be modified based on client parameters. On the server side, easy integration with document servers and the like is made possible, and quality assurance and software updates are made easier.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example, and not by way of limitation in the figures of the accompanying drawings in which like reference numerals are used to refer to similar elements.

FIG. 9 shows an example script for edge detection corresponding to the method of FIG. 8.

DETAILED DESCRIPTION OF PREFERRED EMBODIMENTS

Figure 1:
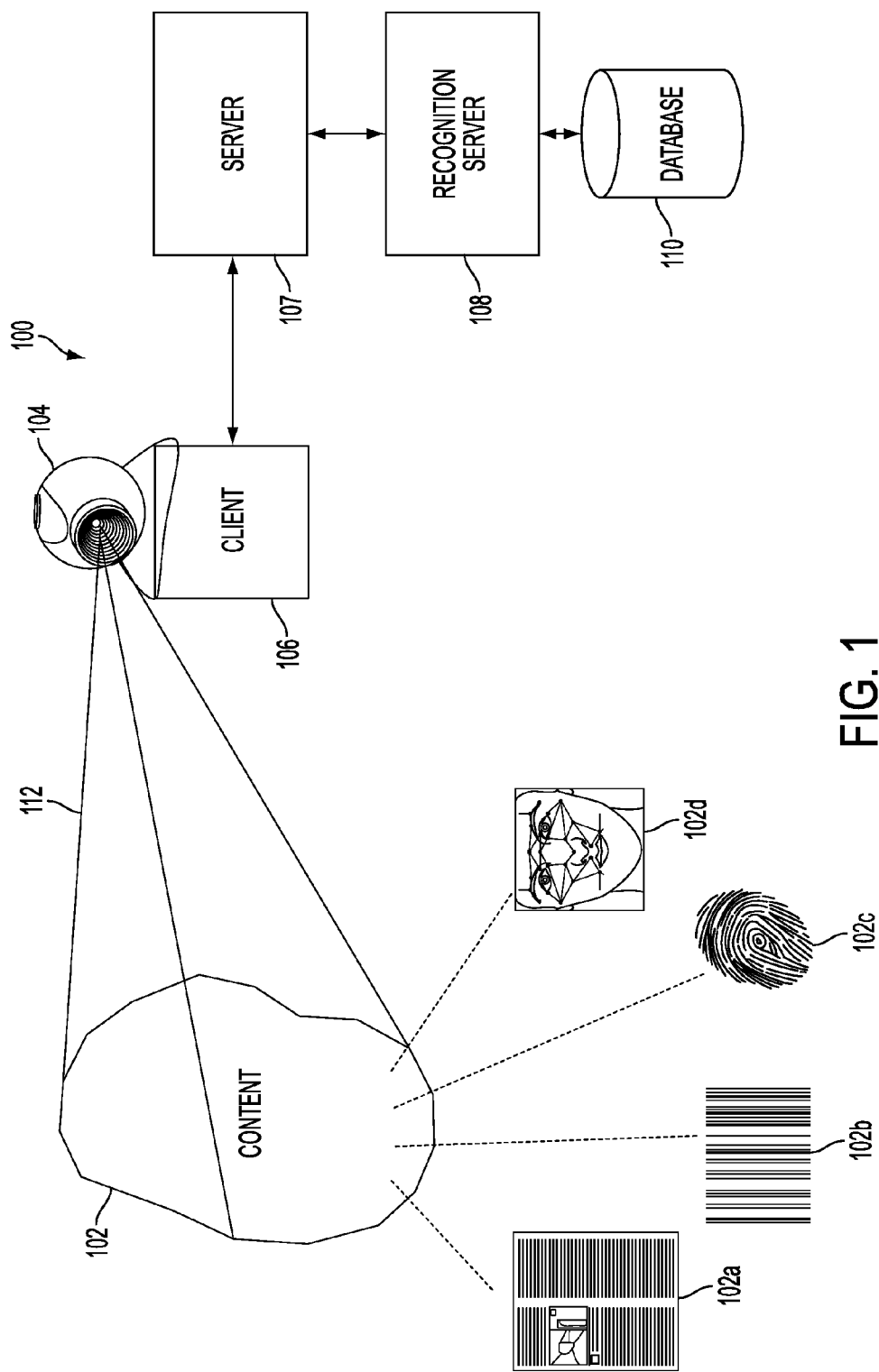
FIG. 1 is a functional diagram of an embodiment of a system for web-based image content detection and image extraction in accordance with present invention.

A system for web-based image content type detection and image extraction using a browser plug-in is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is primarily described below with reference to text recognition, but those skilled in the art will recognize that the present invention applied to any other types of recognition such as finger print, face and bar code recognition to name a few.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Referring now to FIG. 1, an embodiment of a system 100 of the present invention for web-based image content type detection is shown. Content types, as used herein, refer to various forms of content that an image obtained by a capture device 104 can take, such as text, barcode, fingerprint, and facial features to name a few. The present invention uses a web browser plug-in to analyze a captured image to detect a pre-determined content type within the image. For example, the plug-in may be used to detect whether the image is text-like (e.g., where text is the pre-determined content type) or not. In this embodiment, the system 100 comprises: an image capture device 104 associated with a client 106, a recognition server 108 and a database 110, configured to capture an image of content 102 and identify the content type from the image 102. Once identified, corresponding content can be retrieved using the recognition server 108. Some embodiments include a server 107 between the client 106 and recognition server 108. FIG. 1 illustrates an example of the system 100 capturing 112 an image of content 102, such as a document or document portion 102a, a barcode 102b, a fingerprint 102c, a face or image of a face 102d, or other image. The client 106 uses a web-based plug-in to detect a content type in the captured image, extract and image and send the image to the recognition server 108 so that the extracted image can be compare against content stored in the database 110.

The image capture device 104 is any conventional type known in the art. For example, the image capture device 104 may be a web camera, a camera that is part of cell phone, a digital camera or any other camera that outputs a video stream or electronic images. The image capture device 104 can capture video or still images. The present invention is particularly advantageous because it is operable with low resolution image capture devices. The image capture device 104 is coupled for communication with the client 106. This communication may be via a wired or wireless network. In another embodiment, the image captured device 104 is a scanner of a multifunction peripheral or software for generating a printed document. In yet another embodiment, the image capture device 104 could be print capture software for capturing an image of document being print by the multifunction peripheral. These embodiments are used to index documents being output or already printed by a computer (not shown).

The client 106 performs and/or controls image capture, content type detection, image extraction and sending an image to the recognition server 108. In an alternate embodiment, the client 106 may also perform feature extraction and use the extracted features to search the database 110. The client 106 is coupled to the image capture device 104 to receive an image of content 102. The client 106 also is coupled to the recognition server 108 for sending the image to the server 108. In one embodiment, the client 106 comprises a personal computer (see FIG. 2), a browser 308 and plug-in 310 (See FIG. 3). In another embodiment, the client 106 comprises a mobile device, such as a person data assistant (PDA), mobile telephone, mobile web browser, wireless access protocol browser, or other network-capable device. One embodiment of the client 106 will be described below with reference to FIGS. 2, 3A, and 4.

The recognition server 108 performs and/or controls the function of recognition of an electronic document corresponding to a received image. In one embodiment, the recognition server 108 performs feature extraction and searching of the database 110 to identify one or more electronic documents corresponding to the received image. In an alternate embodiment, the recognition server 108 may also perform content type detection and image extraction. The recognition server 108 is coupled to the database 110 to retrieve content corresponding to the image provided by the client 106. In some embodiments, the database 110 is contained within the recognition server 108, or other storage within the recognition server 108 replaces the database 110. The recognition server 108 may use a mixed media (MMR) invisible junctions algorithm for document recognition, as discussed in U.S. patent application Ser. No. 12/059,583, entitled, "Invisible Junction Feature Recognition for Document Security or Annotation," filed Mar. 31, 2008, which is incorporated herein by reference, or may use other MMR-based on non-MMR-based document recognition algorithms, for example but not limited to, optical character recognition (OCR) based document recognition or word boundary-based techniques. For example, see Hull, Jonathan J. et al., Paper-Based Augmented Reality, icat, pp. 205-209, 17th Int'l. Conf. on Artificial Reality and Telexistence (ICAT 2007), 2007, which is incorporated herein by reference. In another embodiment, the server 108 comprises a document server, non-limiting examples of which include Document Mall by Ricoh Ltd of Japan; Enterprise Content Management by Alfresco of Palo Alto, Calif.; Lotus Notes by IBM of Armonk, N.Y., or Sharepoint by Microsoft of Redmond, Wash. One embodiment of the recognition server 108 will be described below with reference to FIGS. 2 and 3C.

In one embodiment, the server 107 is coupled between the client 106 and the recognition server 108. The server 107 receives a request from a browser 310 on the client 106 for a connection. In response the server 107 sends the plug in to the client 106. This is advantageous since the plug in can be provided to any client device that has a browser. In one embodiment, the server 107 is a web proxy server of a conventional type. The server 107 thereafter forwards images, data and commands from the client 106 to the recognition server 108; and data and commands back from the recognition server 108 to the client 106. In one embodiment, this is done with HTTP requests being sent from the client 106 to the recognition server 108, and HTTP responses sent from the recognition server 108 to the client 106.

The database 110 is a conventional type and stores indices, electronic documents and other electronic content, feature descriptions, and other information used in the content type comparison and retrieval process. The database may be a federation of databases. In one embodiment, the database 110 is stored within a multifunction peripheral device (not shown).

The system 100 of the present invention is particularly advantageous because it provides a number of benefits. The system 100 performs initial image processing at a client 106 to determine whether an image is suitable for a recognition process on the recognition server 108. Using a web-based mechanism, the client-side processing is advantageously via a web browser plug-in or other lightweight program that does not require installation on the client 106. The plug-in performs only an initial analysis and reserves compute-intense recognition processes for the recognition server 108. The plug-in also extracts one or a group of images for transmission to the recognition server 108 thereby minimizing the data transfer from the client 106 to the recognition server 108. Document recognition can advantageously be used in conjunction with various document sources such as document servers and desktop search application interfaces for locally-stored desktop search items. The user is advantageously provided access to recognition functionality with any Internet-enabled device without the need to install any software to the device. At runtime, the plug-in can be modified based on client parameters. On the server side, easy integration with document servers and the like is made possible, and quality assurance and software updates are made easier.

System Embodiments

Figure 2:
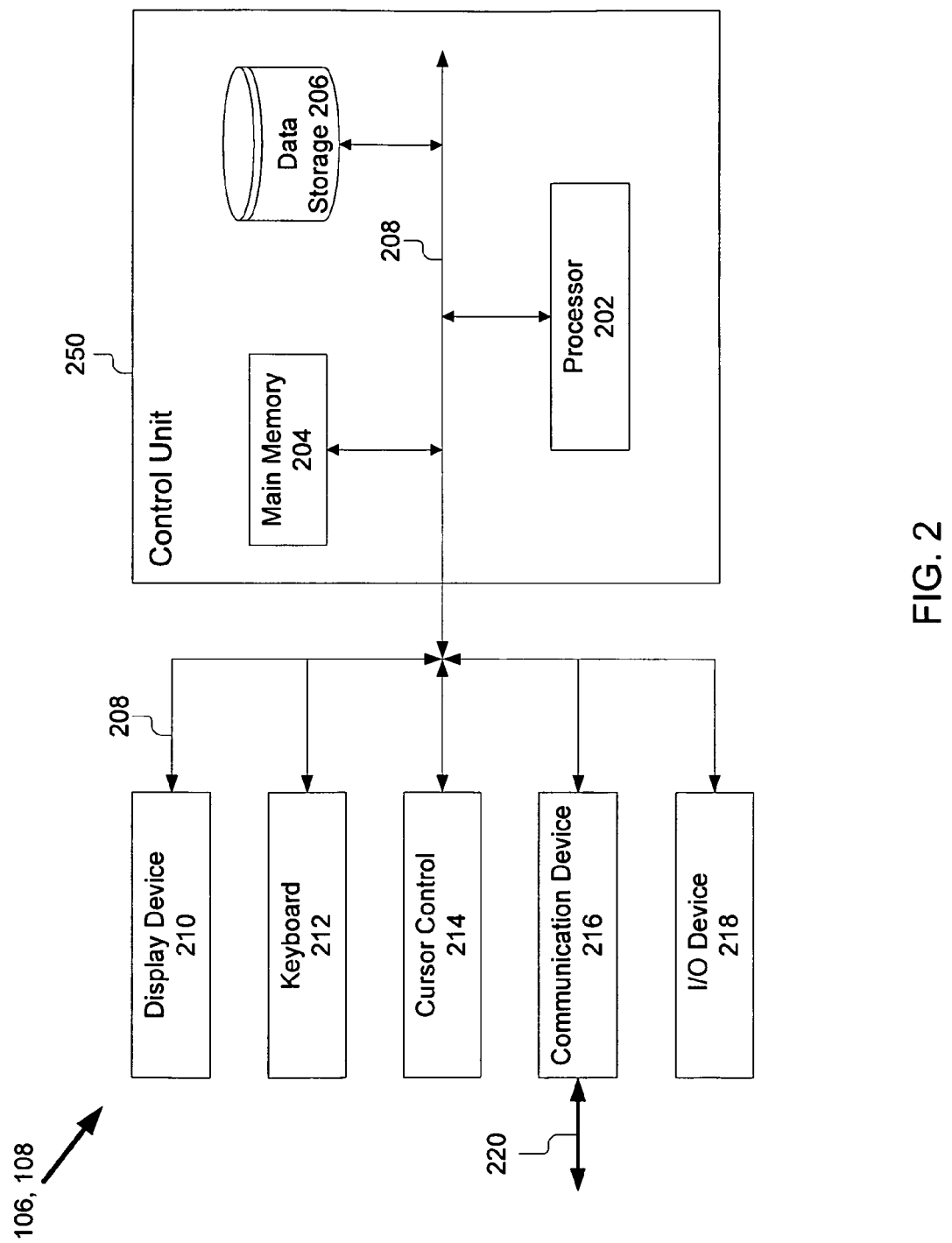
FIG. 2 is a functional block diagram representing a client or a recognition server configured in accordance with an embodiment of the present invention.

Referring now also to FIG. 2, a functional block diagram representing the client 106 or recognition server 108 configured in accordance with an embodiment of the present invention is shown. The client 106 or recognition server 108 preferably comprises a control unit 250, a display device 210, an input device 212, cursor control 214, a communication device 216 and one or more input/output (I/O) devices 218.

The control unit 250 comprises an arithmetic logic unit, a microprocessor, a general purpose computer or some other information appliance equipped to provide electronic display signals to display device 210. In one embodiment, the control unit 250 comprises a general purpose computer having a graphical user interface, which may be generated by, for example, a program written in Java running on top of an operating system like WINDOWS® or UNIX® based operating systems. In one embodiment, one or more application programs are executed by control unit 250 including, without limitation, drawing applications, word processing applications, electronic mail applications, financial applications and web browser applications.

Still referring to FIG. 2, the control unit 250 is shown including processor 202, main memory 204 and data storage device 206, all of which are communicatively coupled to system bus 208.

Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included.

Main memory 204 stores instructions and/or data that may be executed by processor 202. The instructions and/or data may comprise code for performing any and/or all of the techniques described herein. Main memory 204 may be a dynamic random access memory (DRAM) device, a static random access memory (SRAM) device, or some other memory device known in the art. The memory 204 is described in more detail below with reference to FIGS. 3-5.

Data storage device 206 stores data and instructions for processor 202 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, data storage device 206 includes database 110. In an alternate embodiment, the database is coupled to the recognition server 108 via communication device 216 and signal line 220 representing a conventional network.

System bus 208 represents a shared bus for communicating information and data throughout control unit 250. System bus 208 may represent one or more buses including an industry standard architecture (ISA) bus, a peripheral component interconnect (PCI) bus, a universal serial bus (USB), or some other bus known in the art to provide similar functionality. Additional components coupled to control unit 250 through system bus 208 include the display device 210, the input device 212, cursor control 214, the communication device 216 and the I/O device(s) 218.

Display device 210 represents any device equipped to display electronic images and data as described herein. In one embodiment, the display device 210 is a liquid crystal display (LCD) and light emitting diodes (LEDs) to provide status feedback, operation settings and other information to the user. In other embodiments, the display device 210 may be, for example, a cathode ray tube (CRT) or any other similarly equipped display device, screen or monitor. In one embodiment, display device 210 is equipped with a touch screen and/or includes a digitizer in which a touch-sensitive, transparent panel covers the screen of display device 210. The display device 210 is configured to display the user interfaces described in greater detail in FIGS. 10-17B.

In one embodiment, the input device 212 is a keyboard. The keyboard can be a QWERTY keyboard, a key pad, or representations of such created on a touch screen. Cursor control 214 represents a user input device equipped to communicate positional data as well as command selections to processor 202. Cursor control 214 may include a mouse, a trackball, a stylus, a pen, a touch screen, cursor direction keys or other mechanisms to cause movement of a cursor.

Communication device 216 links control unit 250 to a network 220 that may include multiple processing systems and in one embodiment is a network controller. The network of processing systems may comprise a local area network (LAN), a wide area network (WAN) (e.g., the Internet), and/or any other interconnected data path across which multiple devices may communicate. The control unit 250 also has other conventional connections to other systems such as a network for distribution of files (media objects) using standard network protocols such as TCP/IP, http, https, and SMTP as will be understood to those skilled in the art.

One or more I/O devices 218 are coupled to the bus 208. These I/O devices may be part of the other systems (not shown). For example, the I/O device 218 can include an image scanner for capturing an image of a document. The I/O device 218 may also includes a printer for generating documents. The I/O device 218 may also include audio input/output device equipped to receive audio input via a microphone and transmit audio output via speakers. In one embodiment, audio device is a general purpose; audio add-in/expansion card designed for use within a general purpose computer system. Optionally, I/O audio device may contain one or more analog-to-digital or digital-to-analog converters, and/or one or more digital signal processors to facilitate audio processing. For the embodiment where FIG. 2 represents the client 106, the I/O device 218 includes the web camera 104 described above.

It should be apparent to one skilled in the art that client 106 or recognition server 108 may include more or less components than those shown in FIG. 2 without departing from the spirit and scope of the present invention. For example, client 106 and/or recognition server 108 may include additional memory, such as, for example, a first or second level cache, or one or more application specific integrated circuits (ASICs). Further, the client 106 or recognition server 108 may include multiple data buses rather than the single bus 208. Multiple buses allow fast transfer of image data from and between the components of the client 106 and/or recognition server 108, and simultaneous data transfer of user interface information to a display device, for example. Similarly, additional input/output devices 218 may be coupled to control unit 250 including, for example, an RFID tag reader, digital still or video cameras, or other devices that may or may not be equipped to capture and/or download electronic data to control unit 250. One or more components could also be eliminated such as the keyboard & cursor control 212.

Figure 3A:
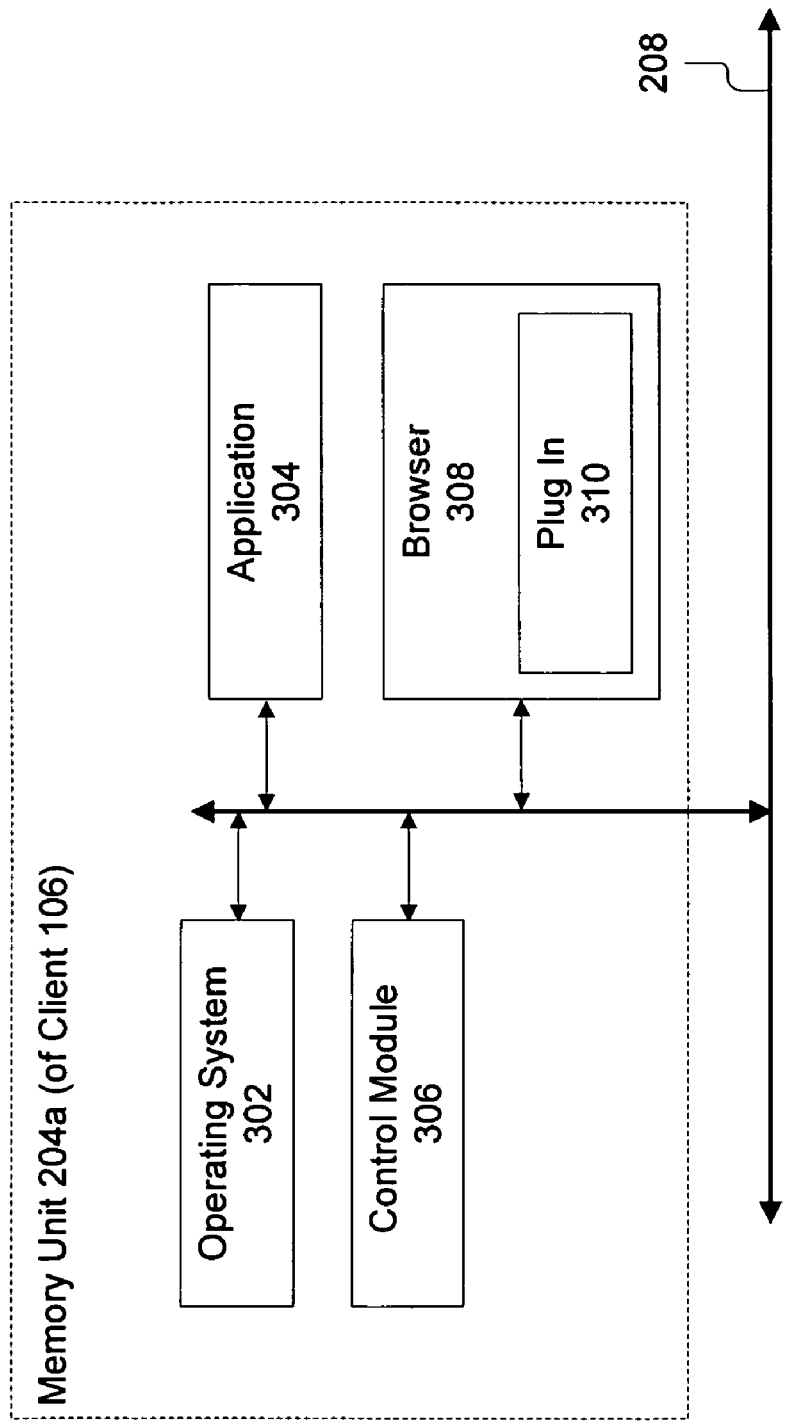
FIG. 3A is a block diagram of one embodiment of a memory unit for the client in accordance with an embodiment of the present invention.
Figure 3B:
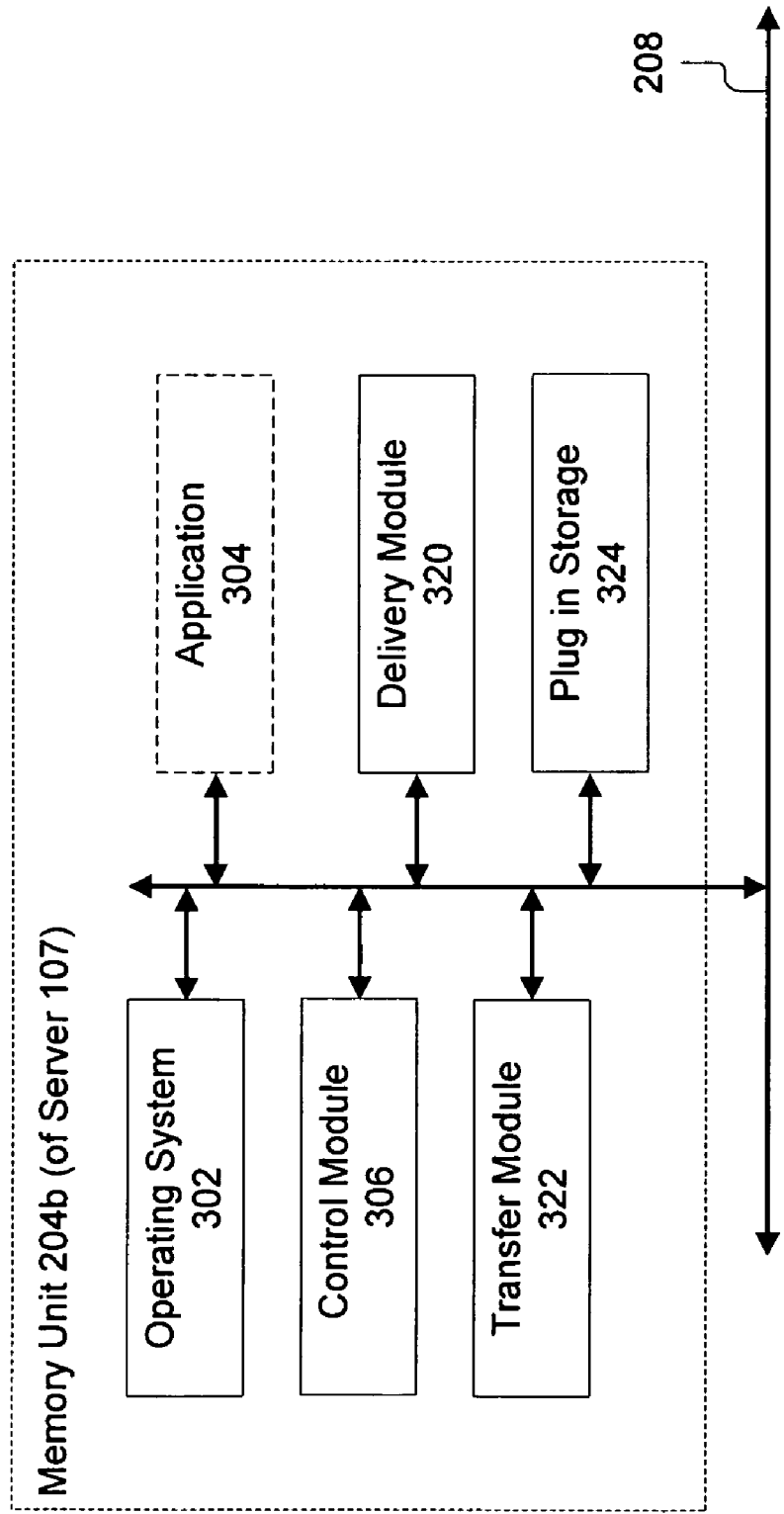
FIG. 3B is a block diagram of one embodiment of a memory unit for the web server in accordance with an embodiment of the present invention.
Figure 3C:
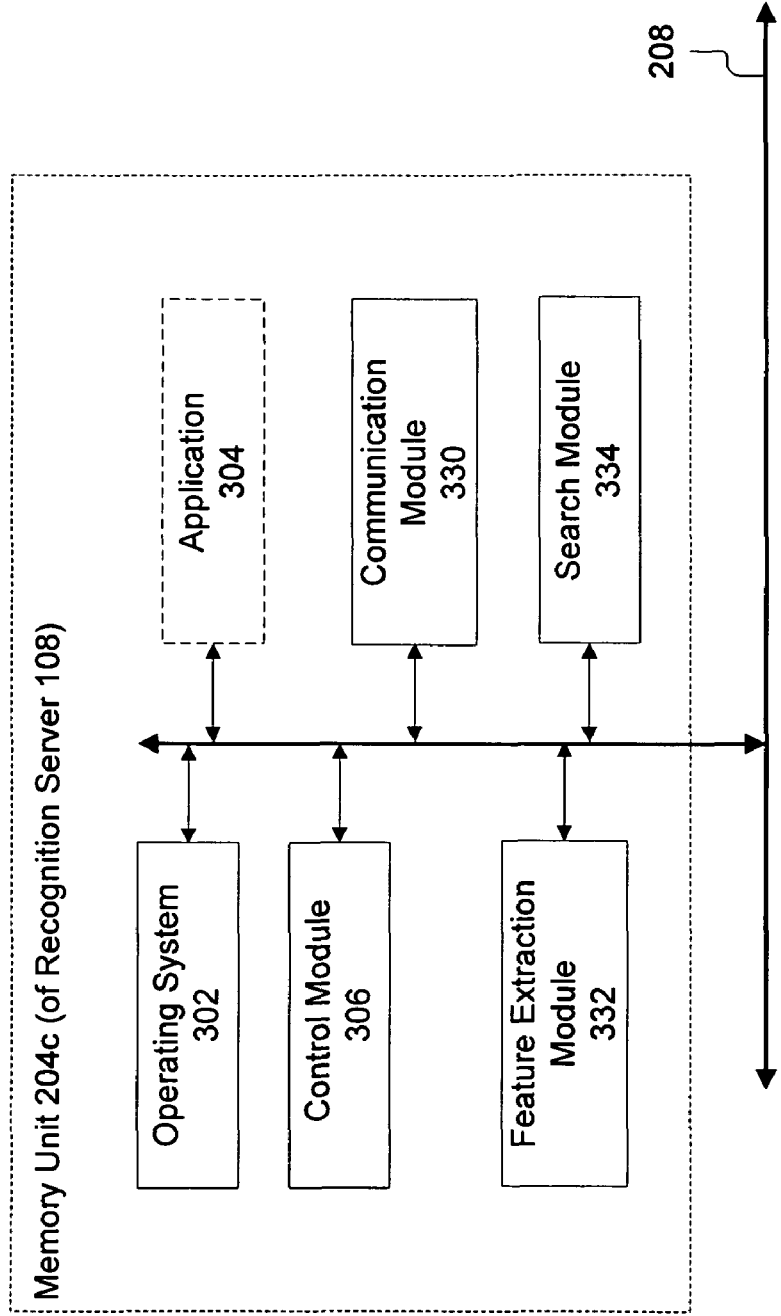
FIG. 3C is a block diagram of one embodiment of a memory unit for the recognition server in accordance with an embodiment of the present invention.

FIGS. 3A-3C are block diagrams of embodiments of the memory unit 204a, 204b and 204c for the client 106, server 107 and recognition server 108, respectively.

Referring now to FIG. 3A, one embodiment of the memory unit 204a for the client 106 is described. The memory unit 204a in this embodiment comprises: an operating system 302, an application 304, a control module 306, a browser 308, and a plug-in 310. Those skilled in the art will recognize that the memory 204a also includes buffers for storing data and other information temporarily during the content type detection, image extraction and image sending processes. As noted above, the memory unit 204a stores instructions and/or data that may be executed by processor 202. The instructions and/or data comprise code for performing any and/or all of the techniques described herein. These modules 302-310 are coupled by bus 208 to the processor 202 for communication and cooperation to system 100.

The operating system 302 is preferably a custom operating system that is accessible to user via an application interface. In an alternate embodiment, the operating system 302 is one of a conventional type such as, WINDOWS®, Mac OS X®, SOLARIS® or LINUX® based operating systems.

The memory unit 204a also includes one or more application programs 304 including, without limitation, drawing applications, word processing applications, electronic mail applications, search application, and financial applications. In one embodiment, the applications 304 specifically utilize the unique capabilities of the other modules or units of memory 204a bridges the gap between electronic documents and paper documents. For example, the applications may communicate and use the browser 308 and plug in 310 as an interface to access electronic documents corresponding paper documents. More specifically, the applications 304 access electronic data from a paper and attach/embed electronic data to specific locations on a paper so that a user can later retrieval that electronic data from the paper, using cameras as the tool for the above operations. For example, one application 304 retrieves an electronic file (Microsoft Word, Adobe PDF, etc) of a printed paper in response to the user simply pointing a capture device 104 and capturing an image of the content 102, printed paper, for example as described in U.S. patent application Ser. No. 11/461,017, entitled "System and Methods for Creation and Use of a Mixed Media Environment," field Jul. 31, 2006, which is incorporated herein by reference.

The control module 306 is used to control the other modules of the memory 204a. The control module 306 is adapted for control of and communication with the application 304, the browser 308, and the plug-in 310. The operation of the control module 306 will be apparent from the description of the figures below. While the control module 306 is shown as a separate module of the memory 204a, those skilled in the art will recognize that the control module 306 in another embodiment may be distributed as routines in the other modules.

The browser 308 is a conventional type such as Internet Explorer by Microsoft®, Firefox by Mozilla, Safari by Apple®, or mobile phone or other wireless browsers provided by manufacturers or wireless service providers. The browser 308 is a software application that enables a user to display and interact with text, images, and other information (Web pages) typically located at a website on the World Wide Web or a local area network. As a software application, the browser 308 provides an application interface to interact with other programs such as the plug in 310.

The plug-in 310 is an auxiliary program that interacts with the browser 308 (e.g., the host application) to provide the web-based image content detection described herein. In one embodiment, the plug-in 310 is a module received at the client 106 from the server 107 when the client 106 browser 308 sends a request to a particular web address. The plug-in 310 may be comprised of a file of commands and/or data or a script that runs in a known browser plug-in (e.g., a .swf file that runs in an Adobe Flash plug-in or player). For example, the plug-in 310 may be a file written in Action Script. According to one embodiment, the plug-in 310 is a .swf file that can be played in Flash players running Flash 8.0 or above from Adobe Corporation of San Jose, Calif. The plug-in 310 may provide some or all of the web-based image content type detection, extraction and transmission functionality described herein according to various embodiments. The plug-in 310 is not installed on the client 106 (i.e., not written to the client 106 disk) according to one embodiment, but is registered with the browser 308 and stored in the memory 204a during use. The plug-in analyzes a captured image or video stream to detect a content type within the image. For example, the plug-in may be configured to detect whether the image is text-like (where text is the content type) or not. One embodiment of the plug-in 310 is described further in conjunction with FIG. 4 below.

Referring now to FIG. 3B, one embodiment of the memory unit 204b for the server 107 is described. For convenience and ease of understanding like reference numerals are used for like components having the same or similar functionality. In one embodiment, the memory unit 204b for the server 107 comprises the operating system 302, optionally one or more applications 304, the control module 306, a delivery module 320, a transfer module 322 and a plug in storage 324. The operating system 302, one or more applications 304 and the control module 306 have been described above so that description will not be repeated here. The additional modules 320-324 are coupled by bus 208 to the processor 202 for communication and cooperation to system 100.

The delivery module 320 is software and routines for transmitting the plug in 310 to the client 106 in response to a request from the browser 310. The delivery module 320 is coupled to bus 208 for communication with the plug in storage 324 and the client 106. In one embodiment, the delivery module 320 retrieves the plug in 310 from the plug in storage 324 and creates a HTTP response including the plug in 310 and sends the HTTP response to the client 106. In another embodiment, the delivery module 320 may also select the plug in to match the capabilities of the browser requesting the plug in 310.

The transfer module 322 is software and routines for sending data and commands between the client 106 and the recognition server 108. In particular, once the plug in 310 is sent to the client 106 and registered with its browser 308, the plug in 310 communicates with the transfer module 322. The transfer module 322 received requests from the client 106 and passes them onto the recognition server 108. Similarly, the transfer module 322 receives responses from the recognition server 108 and sends them to the client 106. Thus, the transfer module 322 effectively facilitates communication between the plug in 310 at the client 106 and the recognition server 108. While this server 107 has been described in terms of a request/response protocol, those skilled in the art will recognize that any number of other communication protocols could be used. Those skilled the art will recognize that the transfer module 322 may also provide other web server or proxy functionality such as performing forwarding, logging, authentication, error handling, encryption and security.

The plug in storage 324 is an area of memory 204b for storing one or more plug ins 310. In one embodiment, the plug in storage 324 storage stores a plurality of different plug ins each adapted to a particular browser and add-ons that are operational on that browser. This is advantageous because the particular plug in can be optimized for the type of browser making the request as well as other functionality available at that browser. Thus, the plug in can be matched to particular versions and brands of browsers and add-ons.

While the server 107 and its memory 204*b* have been described above as distinct modules, those skilled in the art will recognize that in other embodiments, that functionality may be incorporated into the recognition server 108 an its memory unit 204*c*, and the recognition server 108 can communicate with the client 106 directly.

Referring now to FIG. 3C, one embodiment of the memory unit 204*c* for the recognition server 108 is described. Again, for convenience and ease of understanding like reference numerals are used for like components having the same or similar functionality. In one embodiment, the memory unit 204*c* for the recognition server 108 comprises the operating system 302, optionally one or more applications 304, the control module 306, a communication module 330, a feature extraction module 332, and a search module 334. The operating system 302, one or more applications 304 and the control module 306 have been described above so that description will not be repeated here. The additional modules 330-334 are coupled by bus 208 to the processor 202 for communication and cooperation to system 100. Those skilled in the art will recognized that while the present invention will now be described as modules or portions of a memory unit 204 of a computer, the modules or portions thereof may also be stored in other media such as permanent data storage device 206 and may be distributed across a network 220 having a plurality of different computers such as in a client/server environment.

The communication module 330 is software and routines for sending data and commands between the server 107 and the database 110. The communication module 330 communicates with the server 107 to receive and send data and commands from and to the browser 308 of the client 106. The communication module 330 communicates with database 110 to issue queries and receive results including files, data and commands. The communication module 330 also communicates with the feature extraction module 332 and the search module 334. For example, the communication module 330 receives an image from the server 107 and provides it to the feature extraction module 332 for analysis. Similarly, the communication module 330 receives data from the search module 334 and sends it to the server 107 for transfer to the client 106.

The feature extraction module 332 is software and routines for analyzing an image to generated criteria that can be used for a search. In one embodiment, the feature extraction module 332 is coupled to the communication module to receive an extracted image. In an alternative embodiment, once the extracted image is received, the feature extraction module 332 breaks the image into discrete component parts. For example, if the image is determined to be text, the feature extraction module 332 may break the text down into words (or letters or sentences). In the text example, image features may be extracted and corresponding xml files that contain the printed text and text box locations, e.g., resulting from a feature extraction process as described in U.S. application Ser. No. 11/461,017, referenced and incorporated above.

In the memory unit 204*c*, the feature extraction module 332 may comprise software for recognition of content based on images received from the client 106. For example, in the document and text recognition context, the software may include programs for various text-based recognition, such as MMR-based recognition, OCR-based recognition, or word boundary-based techniques. In a barcode context, Tasman, Quickmark, or similar software can be used. In the fingerprint or facial recognition contexts, biometric matching applications known in the art may be used. For example, in the context of biometric recognition generally, see A. K. Jain, et al., An Introduction to Biometric Recognition, IEEE Transactions on Circuits and Systems for Video Technology 14:1, 4-20 (January 2004); in the facial recognition context, see W. Zhao, et al., Face Recognition: A Literature Survey, ACM Computing Surveys (CSUR) 35:4, 399-458 (2003); in the face detection context, see E. Hjelmas and B. K. Low, Face Detection: A Survey, Computer Vision and Image Understanding 83, 236-274 (2001); in the fingerprint recognition context, see generally D. Maltoni et al., Handbook of Fingerprint Recognition (2003), each of which are incorporated herein by reference.

The search module 334 is software and routines for performing searches on the database 110. The search module 334 is coupled to the feature extraction module 332 to receive search criteria produced by the feature extraction process. In one embodiment, the feature extraction module 332 generates or identifies text image features (words) that are used by the search module 334 as keywords to locate matching content, e.g., stored in a database 110, via a document recognition search. In another embodiment, the feature extraction module 332 performs barcode recognition to generate an identification number that is used by the search module 334 to perform a search. In yet another embodiment, the feature extraction module 332 performs facial recognition to generate a person's name, and the search module 334 is used to perform a people search such as on a database or other social network such as Linkedin. The search module 334 issues queries on the database 110 and receives the recognition results that are returned to the client 106 via the communication module 330 and the server 107.

The memory unit 204*c* also includes one or more application programs 304 including, without limitation, drawing applications, word processing applications, electronic mail applications, and financial applications. Another example application 304 is a paper-based photo-wiki, which lets the user attach the pictures you have taken to specific locations on a paper map (and its electronic version), by simply pointing the camera to the desired locations on the physical paper map. There are many other applications 304 such as novel user interfaces to access or browse a document database, digitized pen and paper, map navigator, security in copiers and scanners, camera games and duplicate detection for copyright protection.

In addition, in the document context, additional applications 304 may be used to allow for annotation, linking additional information, audio or video clips, building e-communities or social networks around the documents, and associating educational multimedia with recognized documents. Example applications 304 are described in application Ser. No. 12/060, 2008, entitled "Ad Hoc Paper-Based Networking with Mixed Media Reality," filed Mar. 31, 2008, which is incorporated herein by reference.

Plug in 310

Figure 4:
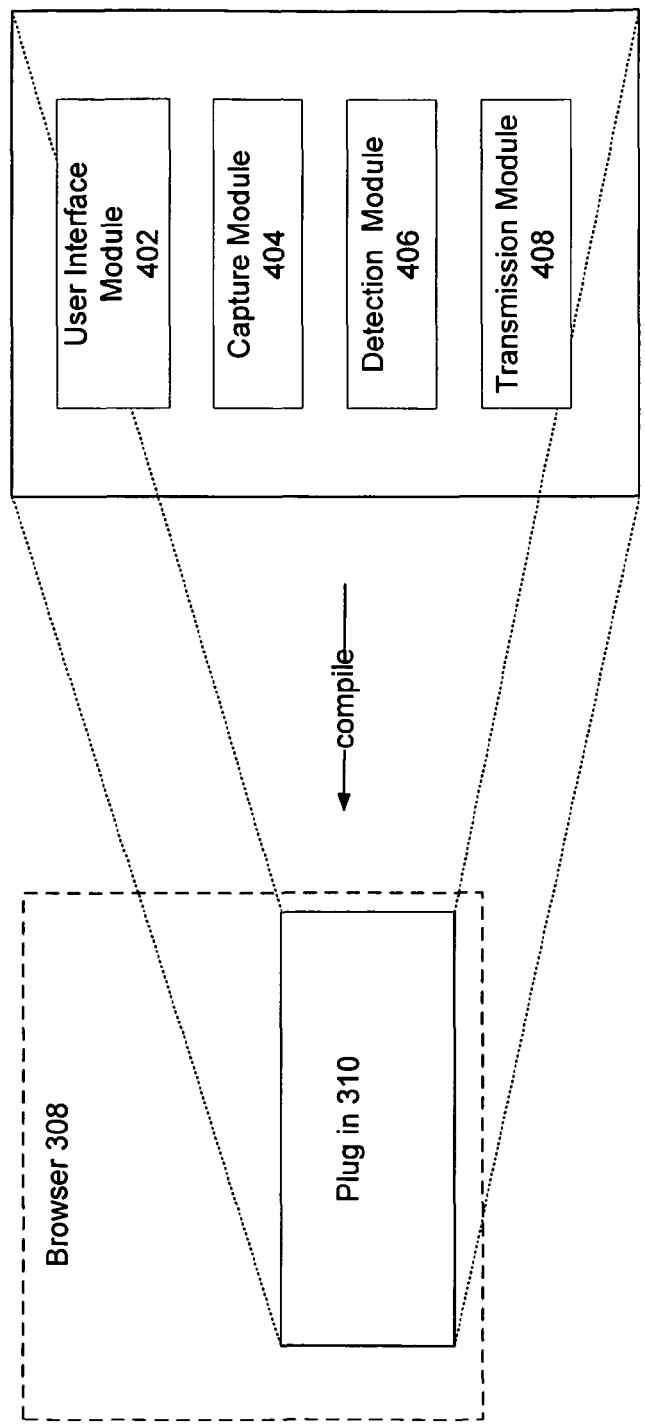
FIG. 4 is a block diagram of a browser and plug-in configured in accordance with one embodiment of the present invention.

Referring now to FIG. 4, there is shown a block diagram of the plug-in 310 configured in accordance with one embodiment of the present invention. For example, the plug-in 310 is implemented as a .swf file that runs in the client 106 for text detection within the image. In one embodiment, the plug-in 310 comprises a user interface module 402, a capture module 404, a detection module 406 and a transmission module 408.

The user interface module 402 is software and routines for generating the user interfaces shown and described below with reference to FIGS. 10-17B. In one embodiment, the user interface module 312 works with the browser 308 to generate visual feedback to the user showing the web-based image content detection process. The user interface module 312 also receives commands and data from the user via the user interface. The user interface module 312 provides a display of the web-based content type detection process and results of document recognition, and may produce multiple web pages in some embodiments. In one embodiment, the user interface module generates the user interface 1000 shown in FIG. 10A. For example, in an embodiment in which a document server is utilized, once a document is recognized, it has a web page associated with it that contains a collection of information about the document, such as comments, marked sections, links to uniform resource locators (URLs), links to other documents, media clips, and the like. FIG. 11 shows an example of a user interface 1100 corresponding to this embodiment.

The capture module 404 is software and routines for controlling the capture device 104 to capture one or more images of content 102. The images may be video frames or still images according to various embodiments. The capture module 404 receives the images from the capture device 104, and temporarily stores the image for analysis by the detection module. The capture module 404 is coupled to the capture device 104 and the detection module 406. Regardless of the type of content detection being performed, the capture module 404 generates an image that can used for further analysis whether it be bar code detection, text detection, finger print detection, face detection, or any other type of detection.

The detection module 406 is software and routines for detecting a type of content from one or more images by analyzing the images. An example of content type detection functionality in the form of text detection is described in greater detail in conjunction with FIGS. 8 and 9, discussed below. In addition to text detection, for facial or object recognition, the plug in 310 can include analysis that is color thresholding based, e.g., for lightweight face detection. At runtime, the plug-in 310 can be modified based on client parameters, such as date/time, location, client device computational requirements and the like. In one embodiment, the detection module 406 performs preliminary analysis not to perform the actual recognition, but a simplified analysis to determine whether the image includes text and therefore should be transmitted for full recognition processing. The detection module 406 is coupled to the capture module 404 to receive images that have been captured.

The transmission module 408 is software and routines for filtering the images captured by the capture module 404, and converting them to bit maps and transmitting them to the server 107. The transmission module 408 is coupled to the capture module 404 to receive images. The transmission module 408 is also coupled to the detection module 406 to receive an indication of when content of the desired type has been detected. In one embodiment, the transmission module 408 filters the images captured by the capture module 404 to send only one frame that includes the detected content type. This is particularly advantageous because rather than sending number frames of video from the capture device, a single image frame can be sent for recognition. This makes the transfer much faster and does not affect the latency of the network connections of the client 106. As noted above, the transmission module 408 takes such an image received from the capture module 404 converts the image to a bitmap and then sends the bitmap as part of an HTTP requests to the server 107 and then onto the recognition server 108. In alternate embodiments, the transmission module 408 could send a plurality if bitmap files each corresponding to an image received from the capture module 404 or bitmap files for all of the images received from the capture module 404.

Alternate Configurations

FIGS. 5A-5D show four different configurations of client 106 and server 108 architectures, used in conjunction with the database 110, in which the web-based content type detection functionality takes place. Although these four examples are specifically described, those skilled in the art will recognize any number of other architectures that may be created without departing from the spirit of the present invention. These architectures are described with the major components, namely, the capture module 404, the detection module 406, the feature extraction module 332 and the search module 334 for clarity and ease of understanding although other modules not shown may be required for implementation. In some embodiments, the memory unit 204a, 204b, 204c of the client 106, server 107 and recognition server 108 may include the modules described below in the architectures of FIGS. 5A-5D.

Figure 5A:
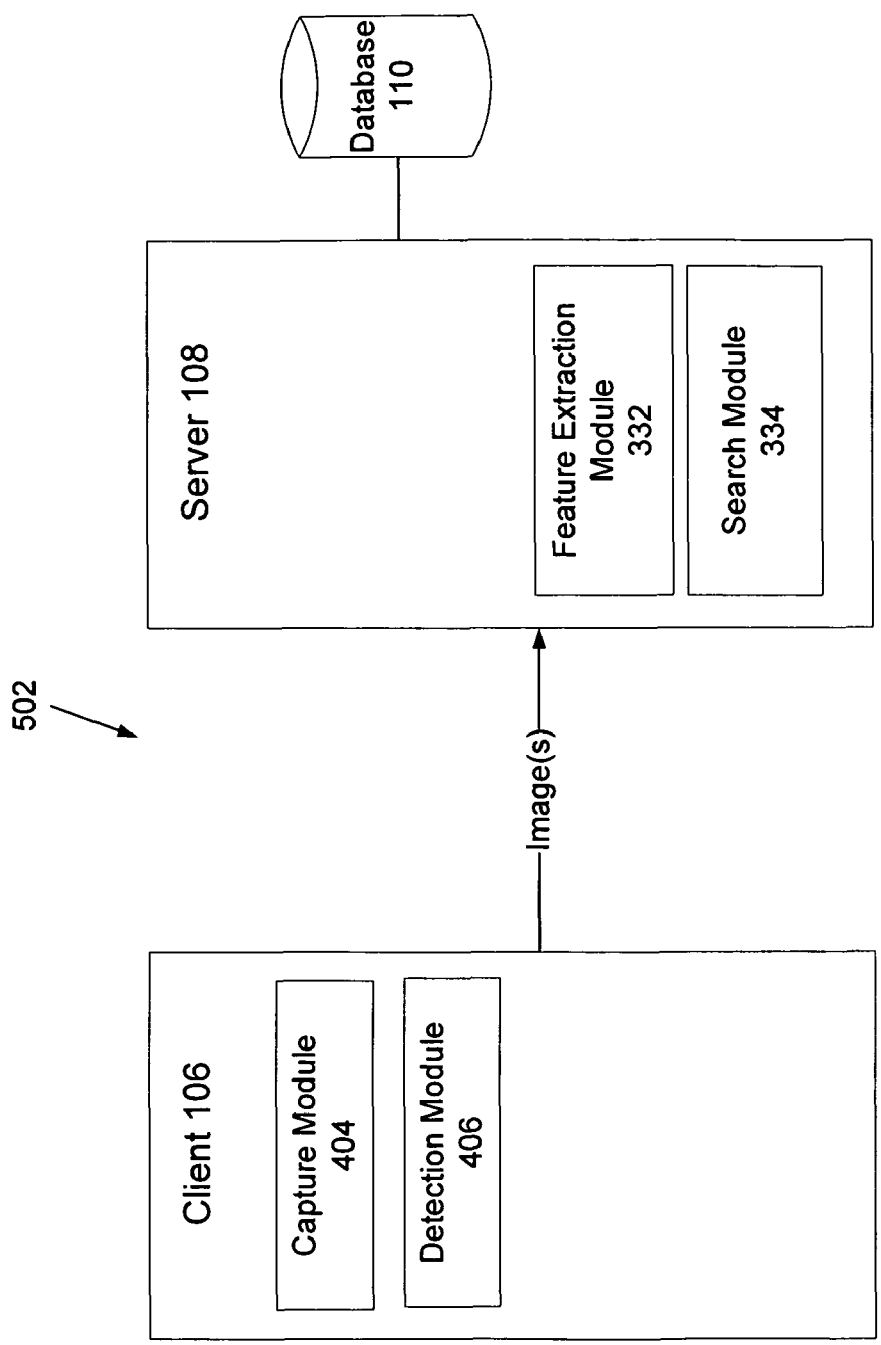
FIGS. 5A-5D are block diagrams illustrating various configurations of distribution of a capture module, detection module, feature extraction module, and search module in accordance with one embodiment of the present invention.

FIG. 5A shows a first architecture 502 where the client 106 comprises the capture module 404 and the detection module 406, and the recognition server 108 comprises the feature extraction module 332 and the search module 334. This configuration is useful for lightweight pre-determined content detection at the client, 106 with more resource-intensive content recognition at the server 108.

Figure 5B:
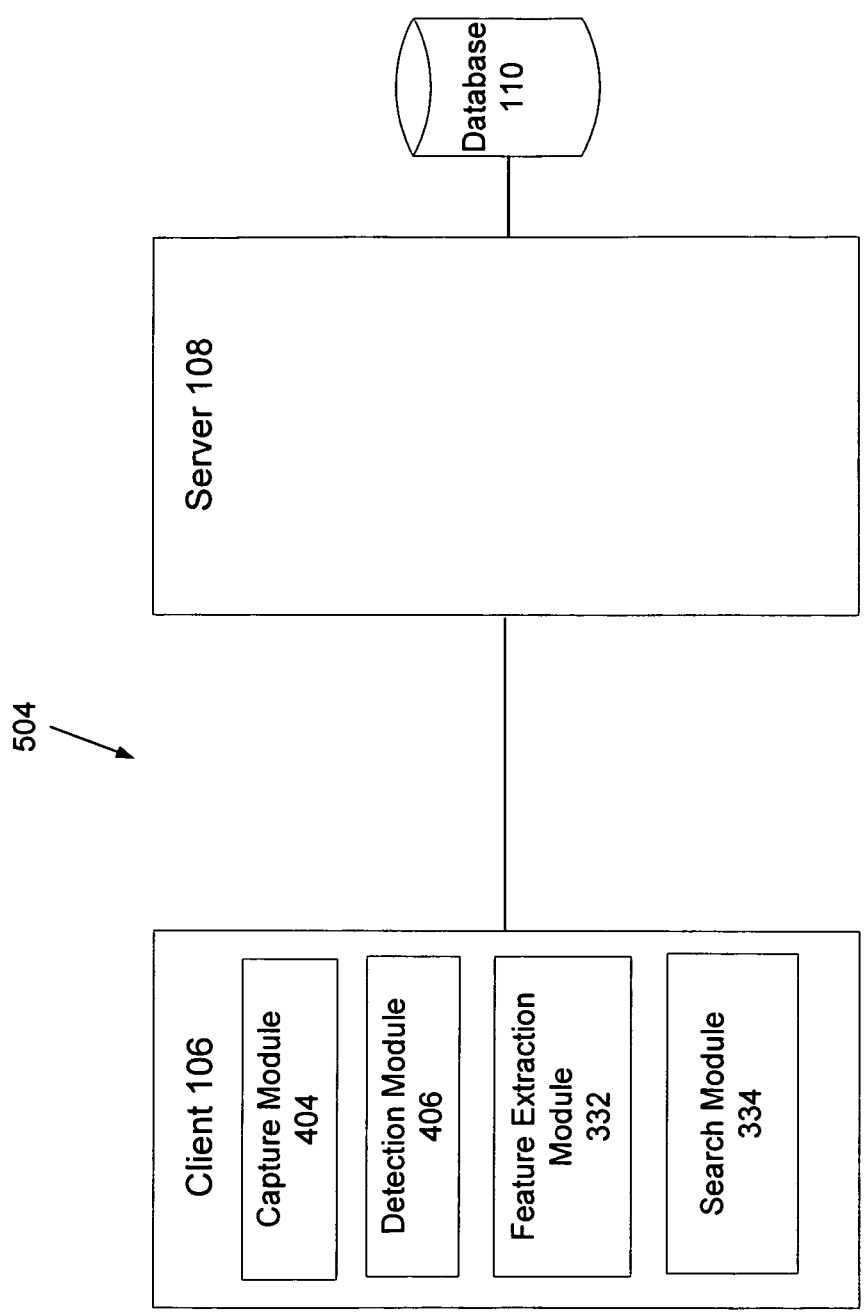

FIG. 5B shows a second architecture 504, in which the client 106 comprises the capture module 404, the detection module 406, the feature extraction module 332 and the search module 334. In this example, the modules 404, 406, 332 and 334 run as if the client 106 and server 108 were on one machine. In addition, in this example the search module 334 uses the client 106 storage as the search database, providing desktop search functionality. In this example the desktop search functionality may be used in conjunction with a separate desktop search application, e.g., by using its application programming interface (API) to access its functionality. In this example, in addition to the standard interface 1000 shown in FIG. 10, additional interface functionality is shown corresponding to the desktop search functionality, e.g., as depicted in the user interface 1200 of FIG. 12.

Figure 12:
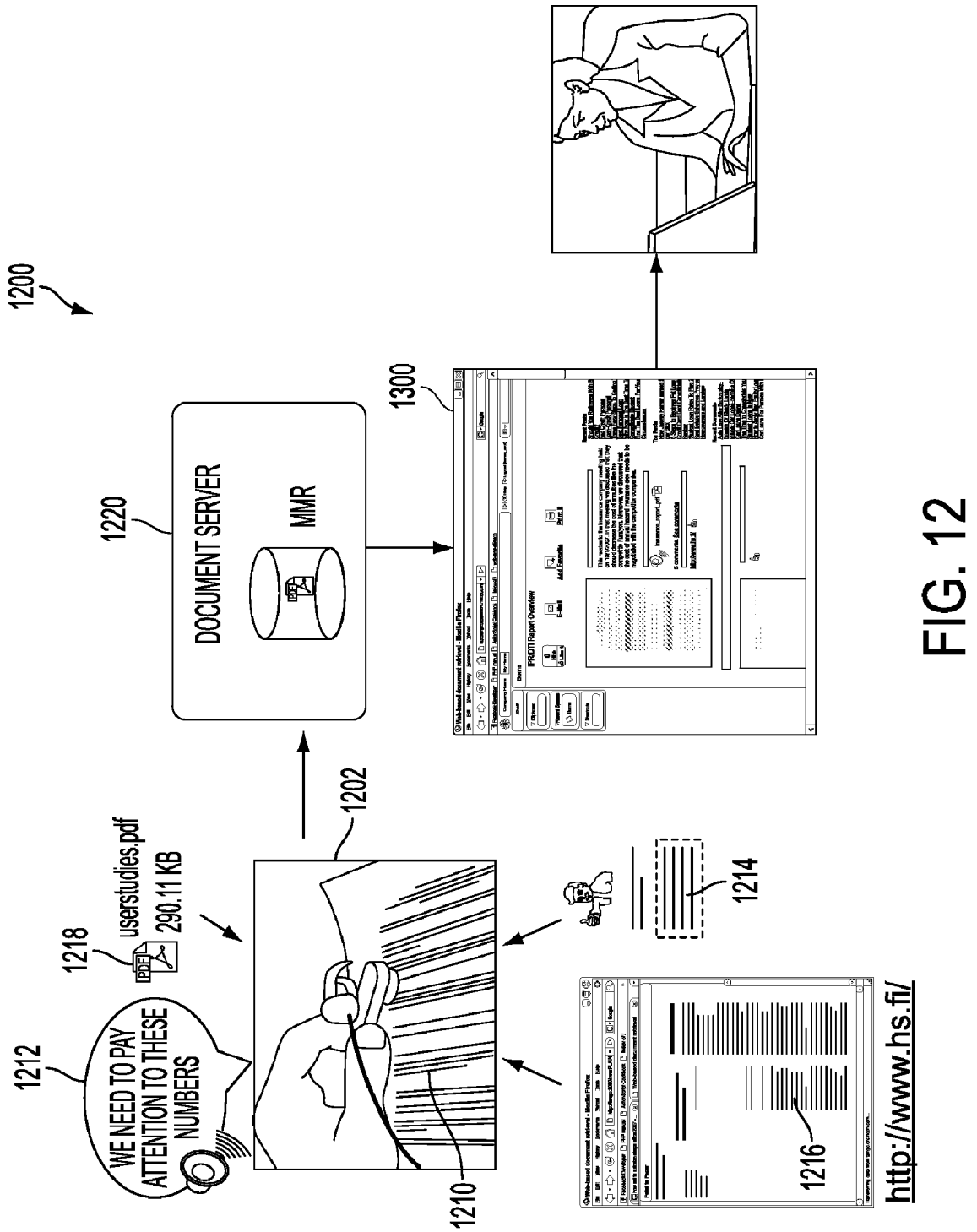
FIG. 12 is a functional diagram of an embodiment of a system and method for web-based text detection with document blogging in accordance with present invention.

In another example embodiment in which a desktop search functionality is utilized, once a document is recognized, it has a wiki page or blog page associated with it that can be edited by editing the wiki or blog, or by using MMR-assisted editing and annotating techniques, such as described in U.S. patent application Ser. No. 12/060,206, entitled "Indexed Document Modification Sharing with Mixed Media Reality," filed Mar. 31, 2008, which is hereby incorporated herein by reference. FIG. 12 shows an example of a user interface 1200 corresponding to this embodiment.

Figure 5C:
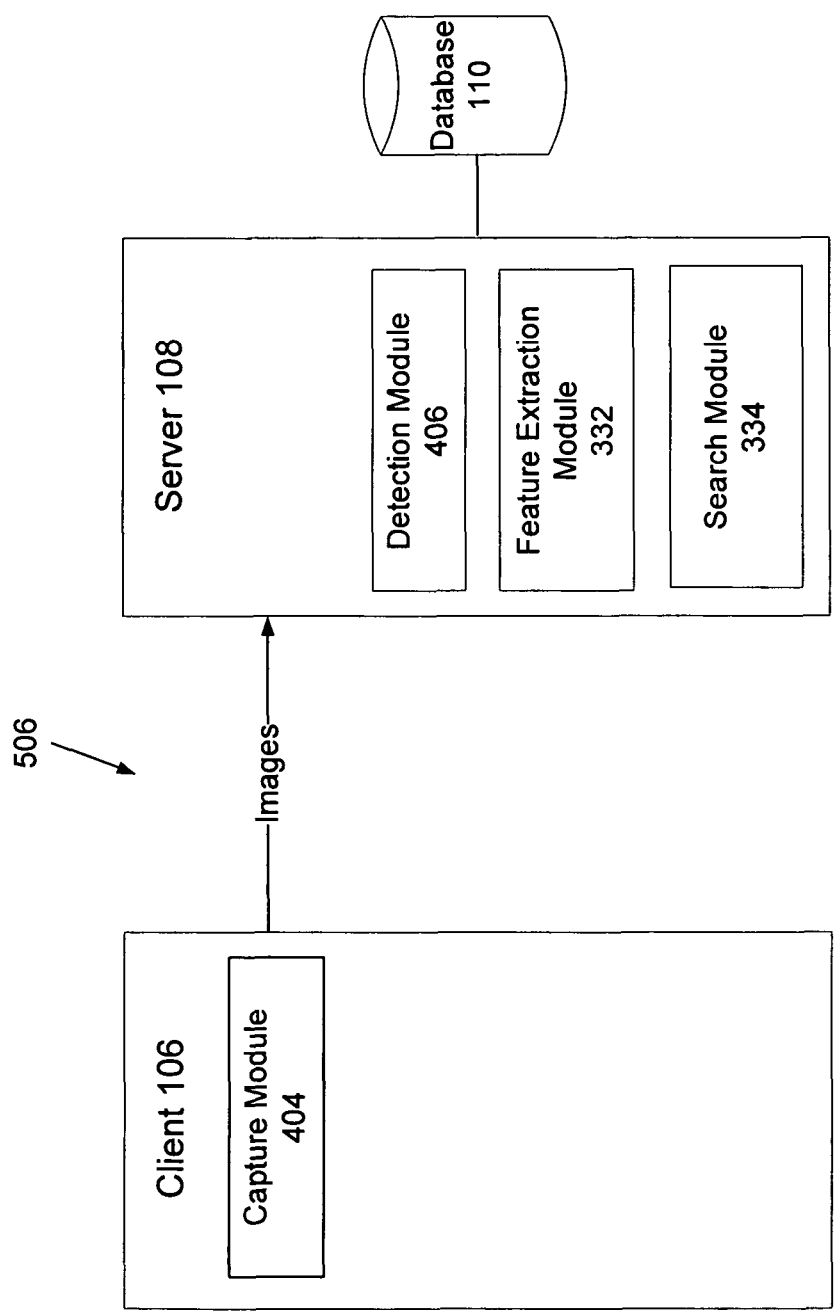

FIG. 5C shows a third architecture 506, in which the client 106 comprises only a very simple web plug-in 310 that include the capture module 304 and sends all captured images to the server 108, which comprises modules 406, 332 and 334. In this example, the server 108 comprises the detection module 406 and thus performs the content type detection functionality.

Figure 5D:
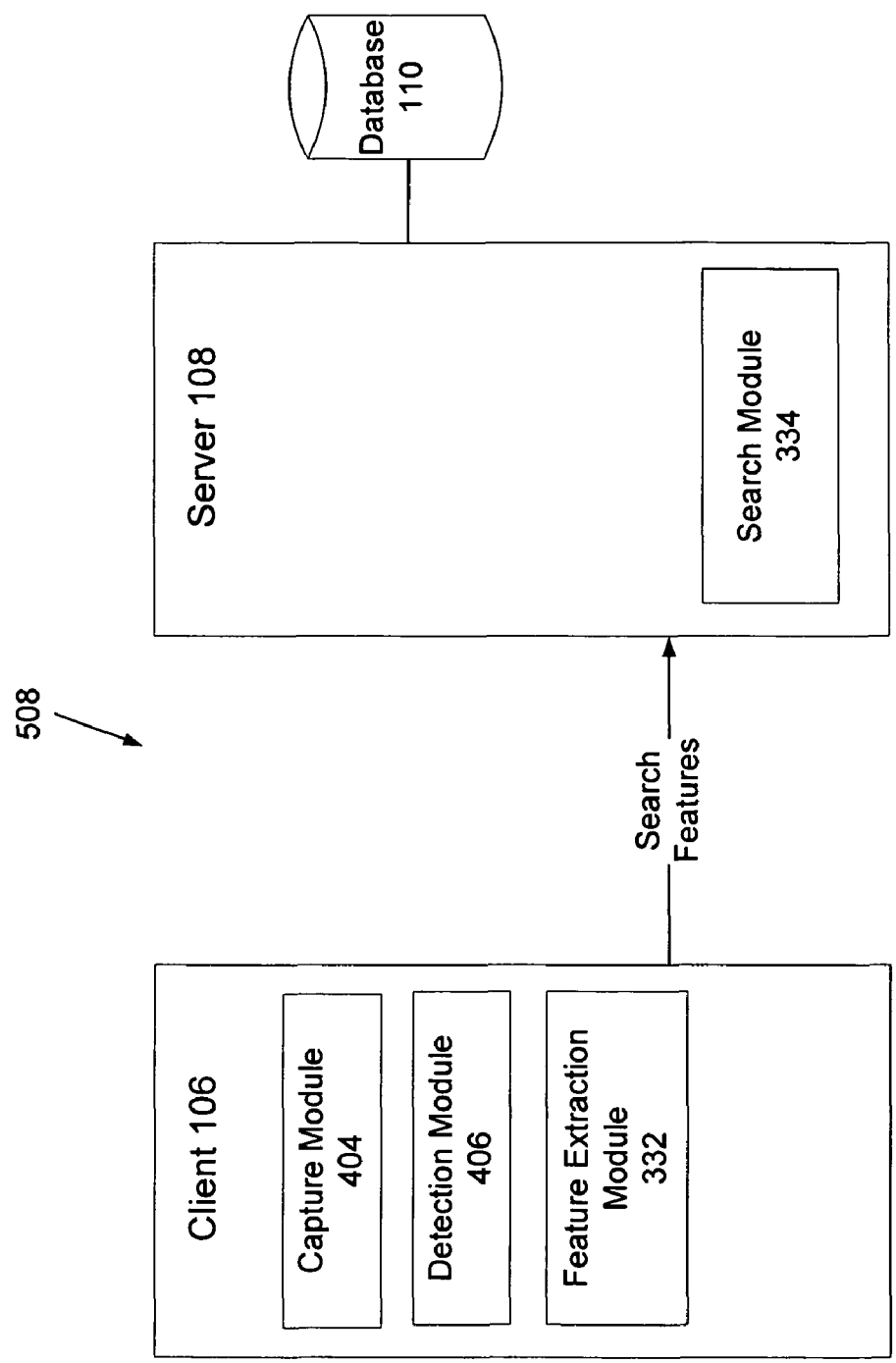

FIG. 5D shows another architecture 508 where the client 106 comprises the capture module 404, the detection module 406 and the feature extraction module 332, and the recognition server 108 comprises the search module 334. This configuration is useful for large document and other large data collections, for which discerning the content type (e.g., text) and determining the search parameters (e.g., search features or terms identified in the text) can be performed on the client 106 using a browser plug-in 310 prior to submitting a search (e.g., keyword search query) to a large (e.g., document) collection. In this example, in addition to the standard interface 1000 shown in FIG. 10, additional interface functionality is shown corresponding to the large collection, e.g., an Alfresco document management server as depicted in the user interface 1100 of FIG. 11.

Various content types may be detected via the modules 404, 406, 332 and 334, for example, document/text recognition for a text search, barcode recognition for an identification search, and face recognition for a people search (e.g., using social networking software). Thus, the modules 404, 406, 332 and 334 are used as input for a search engine according to one embodiment, e.g., in the example in which database 110 is a document server or other large data collection.

Methods and User Interfaces

Figure 6:
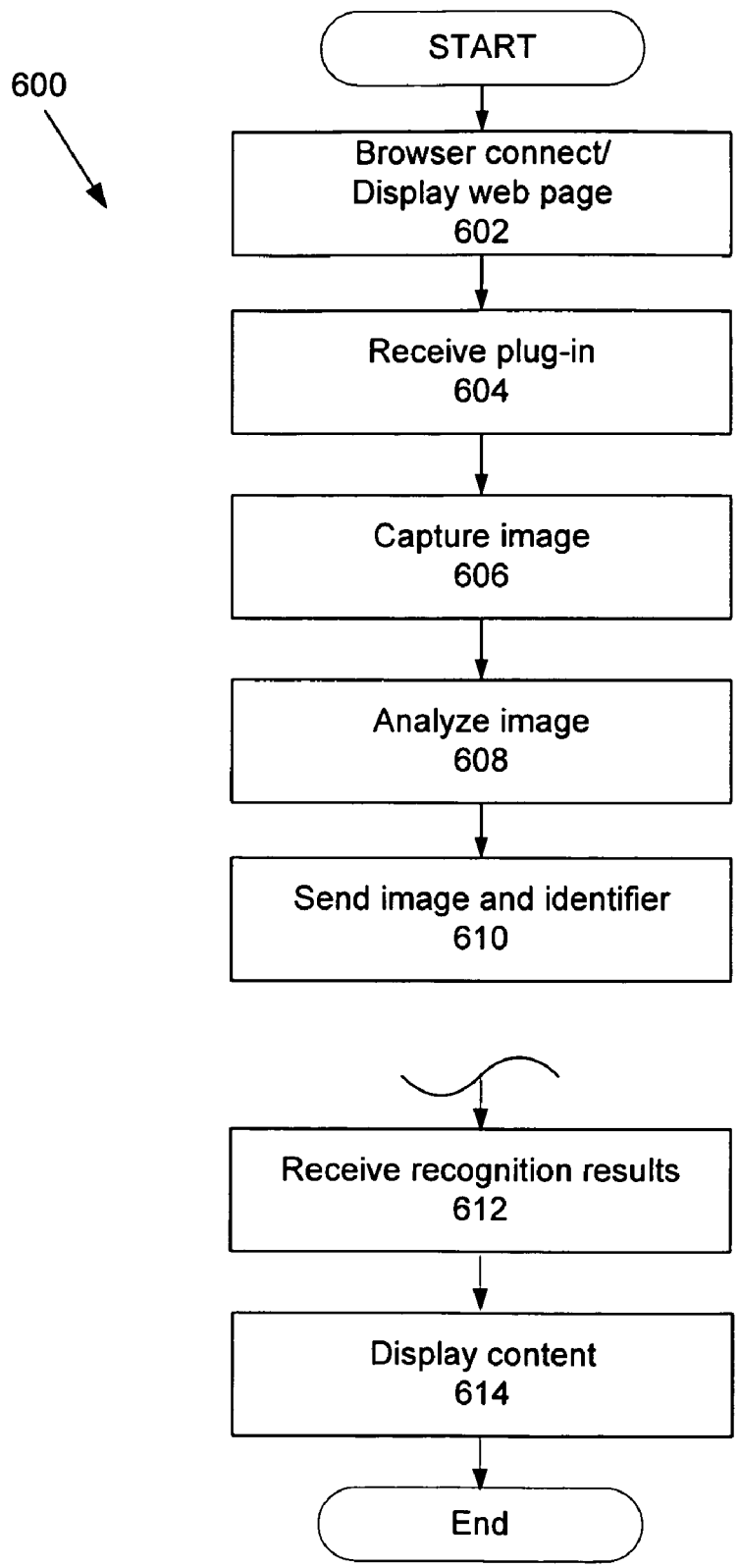
FIG. 6 is a flow chart of an embodiment of a method for web-based content type detection in accordance with the present invention.

FIG. 6 is a flow chart 600 of an embodiment of a method for web-based content type detection in accordance with the present invention.

The method begins with a web browser connecting 602 to a web page, which is displayed via the web browser 308. A plug-in 310 is then received 604 to be used in conjunction with the browser 308 to perform various services, such as described in steps 606 through 610. In one embodiment the plug-in 310 comprises a .swf file as described in conjunction with FIG. 4. However, the plug-in 310 can be any computer program that interacts with the host application (browser 308) to provide the functionality described herein.

Next, an image is captured 606 using an associated capture device 104, e.g., as a service of the plug-in 310. The capture device 104 may be a mobile phone and the capturing may take place using a camera associated with the mobile phone according to one embodiment. However, in other embodiments, other capture methods and devices may be used; for example, a document may be scanned by a scanner such as, or may be captured via a printer driver upon printing. Next, the captured image is analyzed 608 to ascertain the content type it contains, e.g., as a service of the plug-in 310. For example, the analysis may include a determination whether the captured image includes text content, includes barcode content, includes fingerprint content, or includes an image of a face or other discernable object. According to one embodiment, different plug-ins are used for different content type identifications, e.g., one plug-in for text detection, another for barcode detection, etc. Once the analysis 608 is complete, if the image is of the desired type, the image is marked with an identifier and may be sent, e.g., for further analysis, recognition, and/or other action thereon. The image and the identifier then are sent 610, e.g., to a recognition server 108 for the recognition. In one embodiment, the recognition server 108 effectively resides upon the client 106, so no actual "sending" is necessary.

Immediately or at some later point in time, the results of the recognition (e.g., on the recognition server 108) are received 612 (e.g., from the recognition server 108). The results cause a link to be provided to the recognized content, and/or the recognized content associated with the identified image to be displayed 614.

Figure 7:
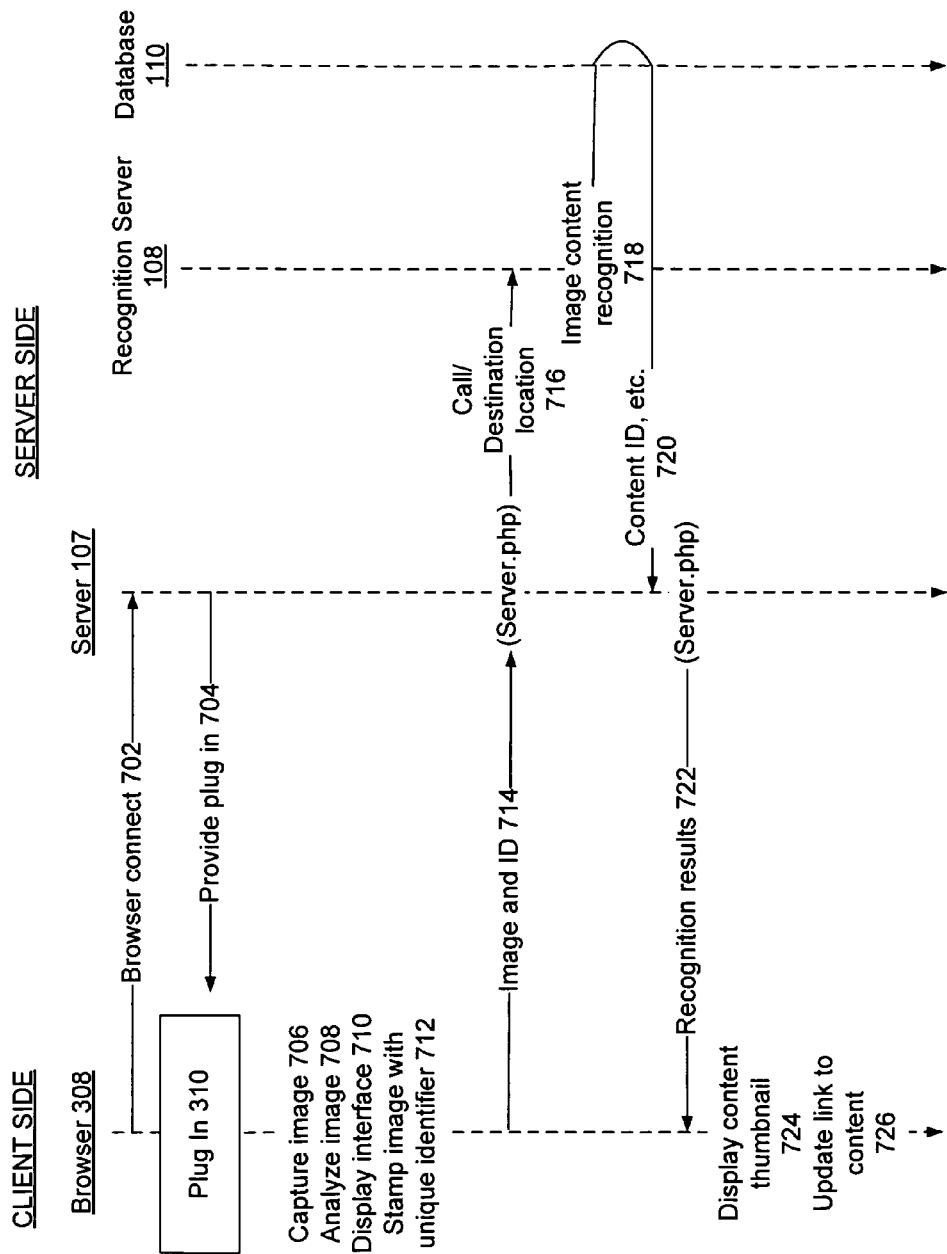
FIG. 7 is an interaction diagram of an embodiment of a method for web-based content type detection in accordance with the present invention.

FIG. 7 is an interaction diagram of an embodiment of a method for image content type detection in accordance with the present invention.

Initially, a client-side web browser 308 connects 702 to a web page provided by a server 107. The server 107 provides 704 the browser 308 with a plug-in 310. The plug-in 310 provides the functionality of steps 706-712, 724-726. The server 107 may be a web server according to one embodiment.

Next, the plug-in 310 directs image capture 706 and analysis 708 as described herein. During these processes 706, 708, the plug-in 310 also provides 710 an interface (e.g., 1000) display such that the user can watch the analysis 708 in progress. An example analysis 708 is described in greater detail in conjunction with FIGS. 8 and 9.

Once the analysis 708 is complete, the image is stamped 712 with an identifier. The image and the identifier then are sent 714 to the server 107 to generate a call 716 to recognition server 108 and provide a destination location for the resulting recognized content. The recognition server 108 performs the image content recognition 718 and if successful, outputs 720 the content identification and saves the recognized image to the destination location. In one embodiment, a successful recognition also is associated with an action, such that recognition of the image content triggers an action such as playing a video clip, document logging, or retrieval of a document. For example, the image could be a barcode, the successful recognition of which triggers the action.

The server 107 then notifies 722 the plug-in 310 with the recognition results. The plug-in 310 controls the interface (e.g., 1000) to display 724 the content thumbnail representation, and updates 726 the link to the recognized content.

Figure 8:
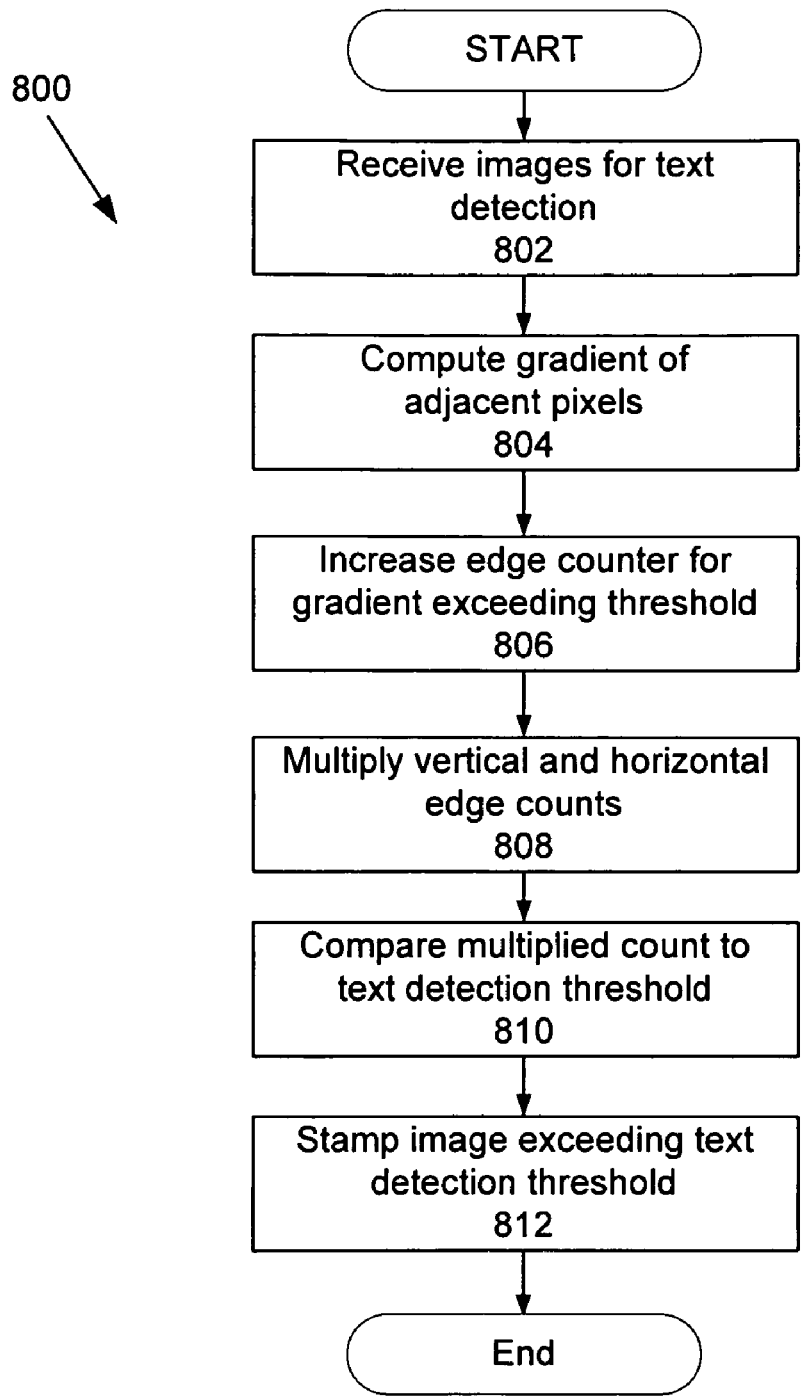
FIG. 8 is a flow chart of an embodiment of a method for web-based text detection by a detection module in accordance with the present invention.

FIG. 8 is a flow chart 800 of an embodiment of a method for image text detection by a text detection module in accordance with the present invention.

The method begins by receiving 802 images for text detection. The gradient of adjacent pixels is computed 804. In one embodiment, the computation is made every "step" pixel to reduced overhead. For example, the computation may be done every tenth pixel. Next, if the computed gradient exceeds an edge threshold, an edge counter is increased 806. In one embodiment, both horizontal and vertical gradients are computed and edge counters are increased. Next, vertical and horizontal edge counts are multiplied 808, and then compared 810 to a text detection threshold. If the multiplied edge counts exceed the threshold, the image is stamped 912 and prepared for sending to the server 108. FIG. 9 shows an example action script for edge detection corresponding to the above method.

Figure 10A:
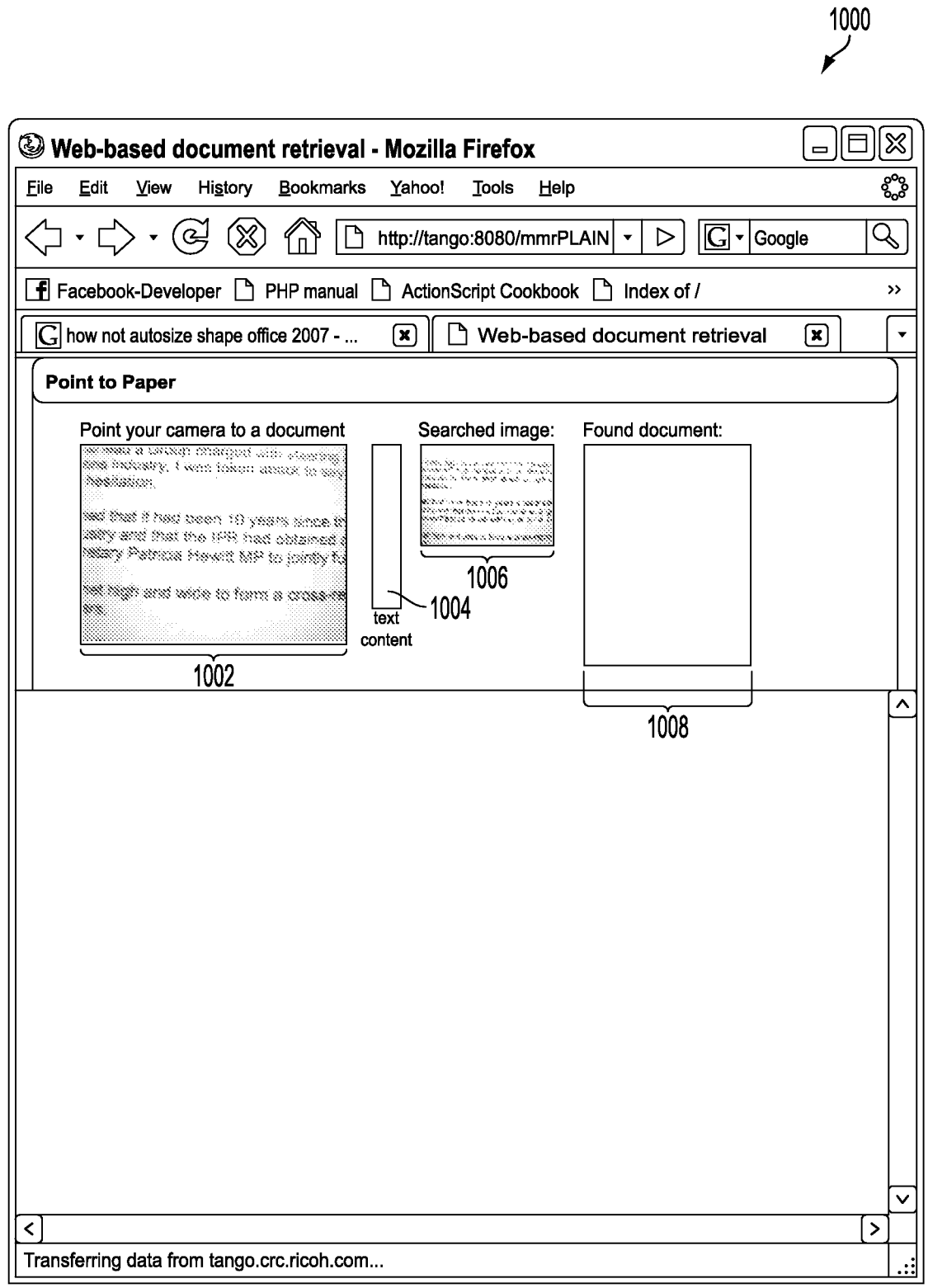
FIG. 10A is a graphical representation of a user interface generated by a method for content type detection in accordance with one embodiment of the present invention.
Figure 11:
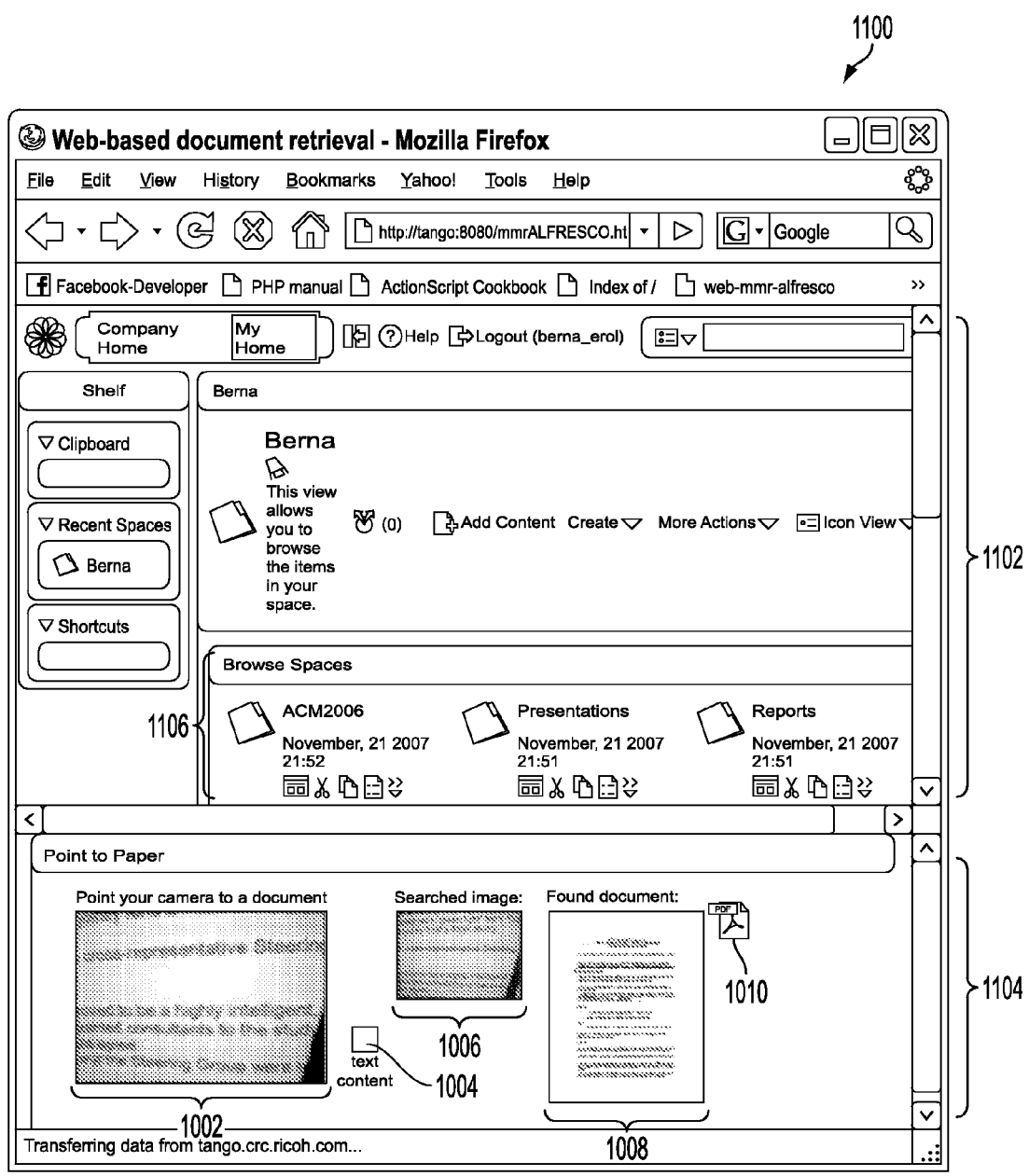
FIG. 11 is a graphical representation of a user interface in accordance with one embodiment of the present invention showing information received from a document server.

FIG. 10A is a graphical representation of the user interface 1000 generated by a method for image content type detection in accordance with one embodiment of the present invention. The user interface 1000 comprises a captured image portion 1002, a content type identification portion 1004, a searched image display portion 1006, and a recognized content portion 1008 according to one embodiment.

In the depicted example, the content type is text. The captured image portion 1002 displays the image as captured by the capture device 104—here, a portion of a textual document. The content type identification portion 1004 indicates to the user that the pre-determined content type (i.e., text) has been identified from the image. The interface 1000 uses color and a bar graph to show the likelihood of the image being the desired content type. The searched image display portion 1006 displays the portion of the image used for searching for matching content. The recognized content portion 1008 displays a thumbnail representation of the recognized content to the user. In this example, the recognition process has not completed; so no content is shown in recognized content portion 1008.

Figure 10B:
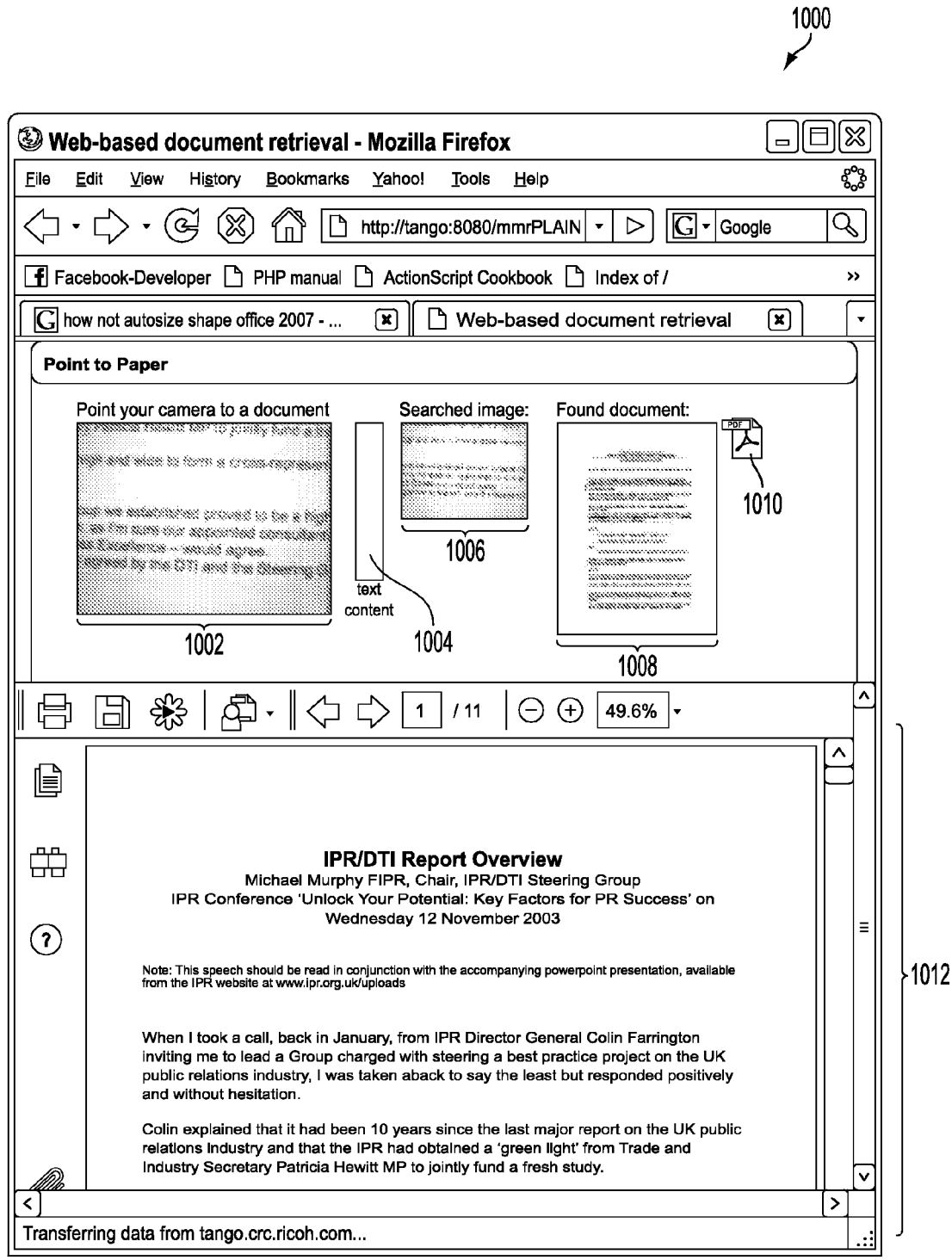
FIG. 10B shows a graphical representation of the user interface in accordance with one embodiment of the present invention once a matching document is found.

FIG. 10B shows one embodiment of the user interface once a matching document is found. FIG. 10B is similar to FIG. 10A, except a document is shown in recognized content portion 1008, as is a recognized content link 1010. The recognized content link 1010 in this example is a PDF icon that links to the recognized document. The recognized content link 1010 provides the user a direct link to the stored, matched content.

FIG. 10B also shows a results window 1012. The results window 1012 displays the recognized document when the user clicks on the recognized content link 1010 according to one embodiment. According to another embodiment, the results window 1012 is automatically populated with the recognized document, without the need for the user to click the recognized content link (icon) 1010. In yet another embodiment, the results window 1012 displays a list of documents, e.g., for recognition and retrieval of more than one document in response to the captured image portion 1002.

FIG. 11 is a graphical representation of a user interface 1100 generated by a method for image text detection in conjunction with a document server in accordance with one embodiment of the present invention.

The user interface 1100 comprises a document server portion 1102 and an image identification portion 1104. The image identification portion 1104 is similar to the user interface 1000 described above in conjunction with FIG. 10A, and thus includes a captured image portion 1002, a content type identification portion 1004, a searched image display portion 1006, a recognized content portion 1008, and a recognized content link 1010.

The document server portion 1102 comprises a list of spaces 1106 in which documents of interest may be located. When used in conjunction with a document server, the method for image text detection searches the documents housed by the document server. When a document server is utilized, once the document is recognized, it has a web page associated with it, e.g., the web page may comprise the user interface 1100 shown in FIG. 11.

FIG. 12 is a functional diagram of an embodiment of a system 1200 and method for web-based text detection with document blogging in accordance with present invention. The system 1200 of web-based text detection with document blogging shown in FIG. 12 is an example of the method for web-based image content type detection of FIG. 6, with document blogging functionality shown.

In this example, a user captures 1210 a portion of a document 1202 and associates other information relating to the document 1202, such as audio or text comments 1212, marked sections 1214, links to uniform resource locators (URLs) 1216, links to other documents 1218, media clips, and the like. This compiled information is sent to the document server 1220, where document recognition occurs, e.g., using MMR. The recognized, annotated document 1222 is then shown to the user as a webpage 1330 graphical user interface 1300, described in greater detail in conjunction with FIG. 13.

Figure 13:
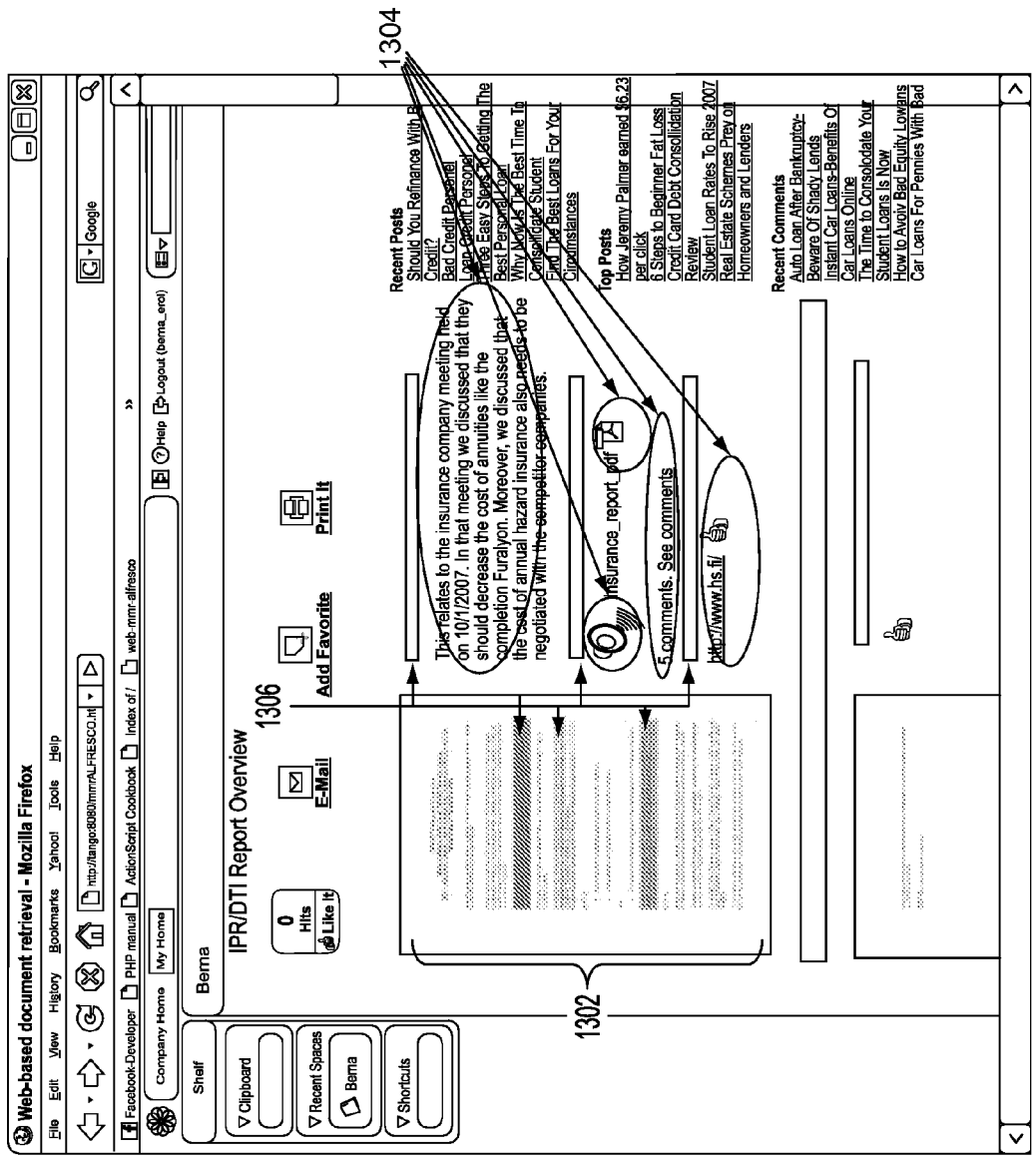
FIG. 13 is a graphical representation of a user interface generated by the method for web-based text detection with document blogging in accordance with one embodiment of the present invention.

FIG. 13 is a graphical representation of a webpage user interface 1300 generated by a method for web-based text detection with document blogging in accordance with one embodiment of the present invention.

The webpage user interface 1300 includes the recognized document 1302 (associated with captured document 1202 of FIG. 12) and various added information items 1304 related to the document 1302, e.g., corresponding to 1212-1218 of FIG. 12, and a visually-distinguishable indication 1306 of where each added item 1304 occurs within the document 1302.

Figure 14:
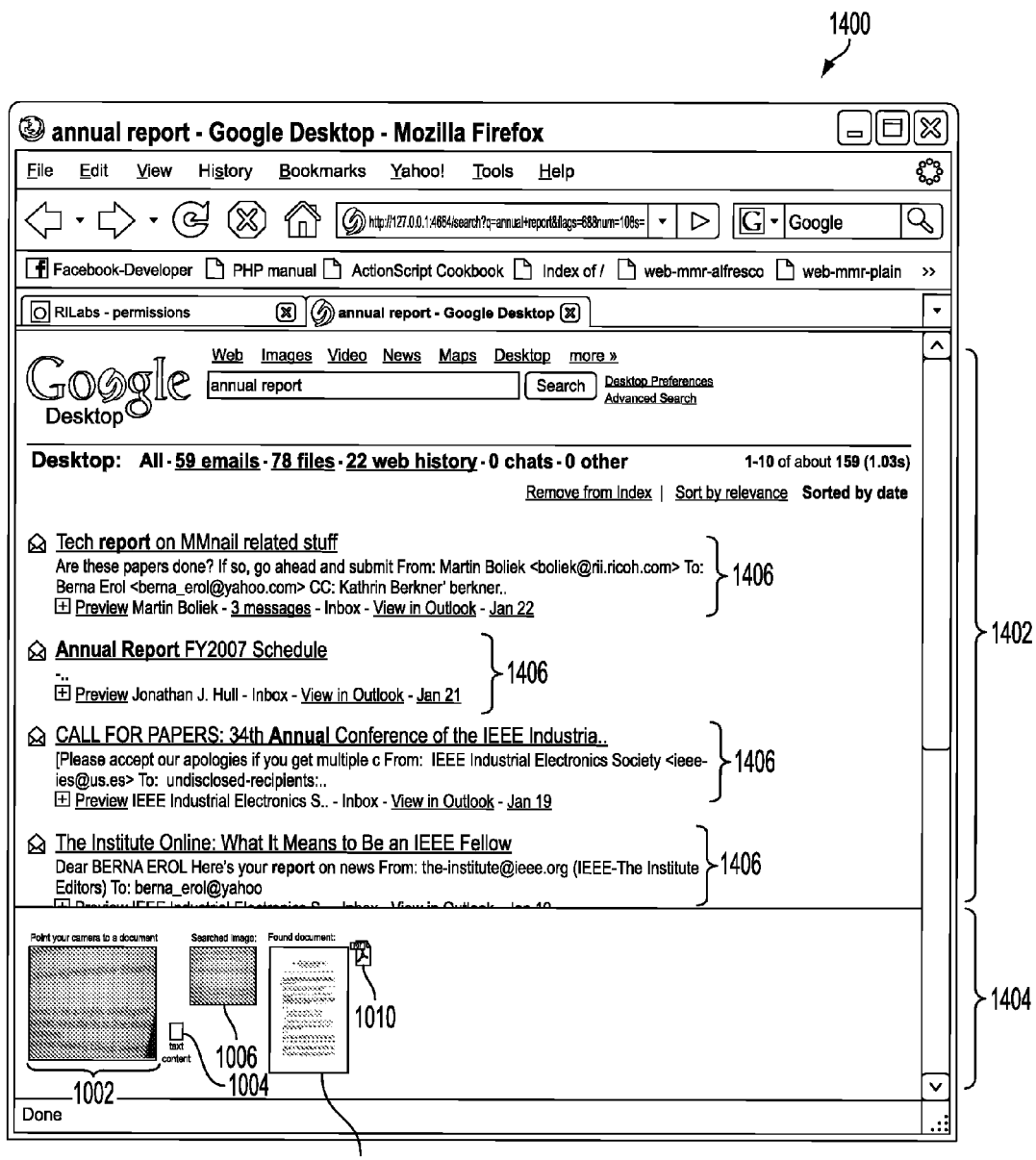
FIG. 14 is a graphical representation of a user interface generated by a method for image text detection in conjunction with a desktop search application in accordance with another embodiment of the present invention.

FIG. 14 is a graphical representation of a user interface 1400 generated by a method for image text detection in conjunction with a desktop search application in accordance with another embodiment of the present invention.

The user interface 1400 comprises a desktop search portion 1402 and an image identification portion 1404. The image identification portion 1404 comprises the user interface 1000 described above in conjunction with FIGS. 10A-10B, and thus includes a captured image portion 1002, a content type identification portion 1004, a searched image display portion 1006, a recognized content portion 1008, and a recognized content link 1010. The desktop search portion 1402 comprises a display of desktop search results 1406 corresponding to the recognized text from the captured image. The desktop search results 1406 can include email, files, and web history entries stored on the client 106. In one embodiment, each desktop search result 1406 includes a file name and a brief snippet with the search terms highlighted. When a desktop search application is utilized in conjunction with the present invention, once a document is recognized, it has a webpage associated with it resemble, shown as user interface 1400.

Figure 15:
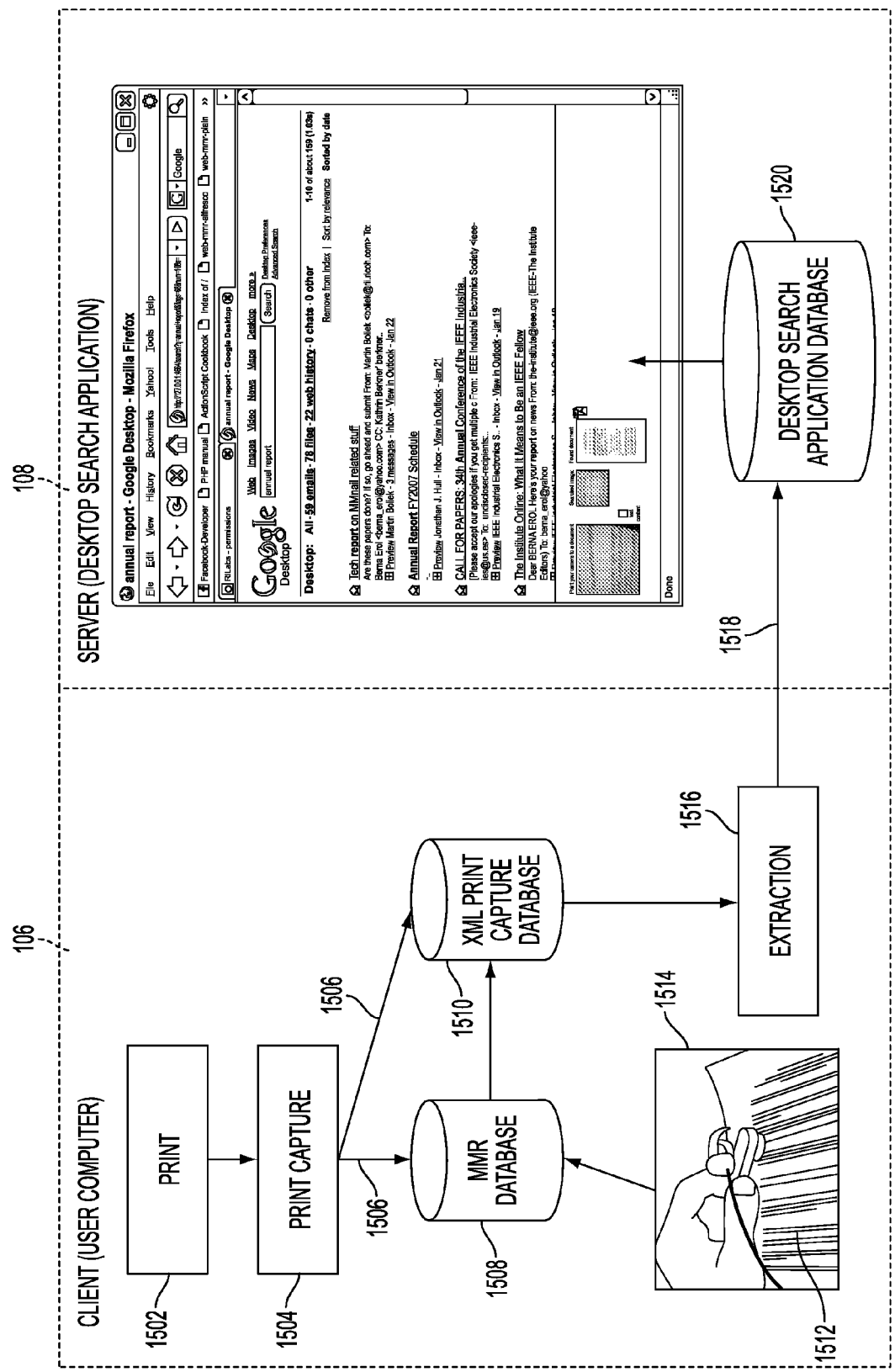
FIG. 15 is a functional diagram of an embodiment of a system and method for web-based image text detection in conjunction with a desktop search application in accordance with present invention.

FIG. 15 is a functional diagram of an embodiment of a system 1500 and method for web-based image text detection in conjunction with a desktop search application in accordance with present invention. The system of image text detection in conjunction with a desktop search application shown in FIG. 15 is an example of the method for web-based image content type detection of FIG. 6, with desktop search functionality shown.

In this example, the client 106 is a user computer (PC or mobile device) and the recognition server 108 is a desktop search application, likely residing on the user computer. Thus, the client 106 and recognition server 108 are indicated with dashed lines to show that they may in fact be contained within a single machine.

In the depicted example, documents may be printed 1502, print captured 1504, and stored 1332 using MMR, as described above and in application Ser. No. 11/461,017, incorporated by reference above. The print capture 1504 is an example of the capture 404, 606 described in conjunction with FIGS. 5A-6. The storage step includes storing to an MMR database 1334, which includes image based text features, such as invisible junction or word boundary-based features, and to an XML Print Capture Database 1510, which includes XML files of the printed text and text box locations (e.g., received from the printer driver at step 1504).

When the web-based image text detection in conjunction with a desktop search application initiates, the user captures 1512 a portion of a document 1514. Using the MMR database 1508, the document 1514 and exact location of the capture within the document is ascertained. Given that location information, the XML Print Capture 1510 files are then parsed to get the exact text at that location and page, i.e., without using an OCR process. From the text, keywords or n-grams can be extracted 1516. These steps are an example of the analysis 504 and feature extraction 332 steps of FIGS. 5A-5D according to one embodiment. The extracted keywords or n-grams then are submitted to the desktop search application database 1520, using the desktop search application interface (API). The results of the desktop search then are displayed in a web page, e.g., user interface 1400 of FIG. 14.

Figure 16:
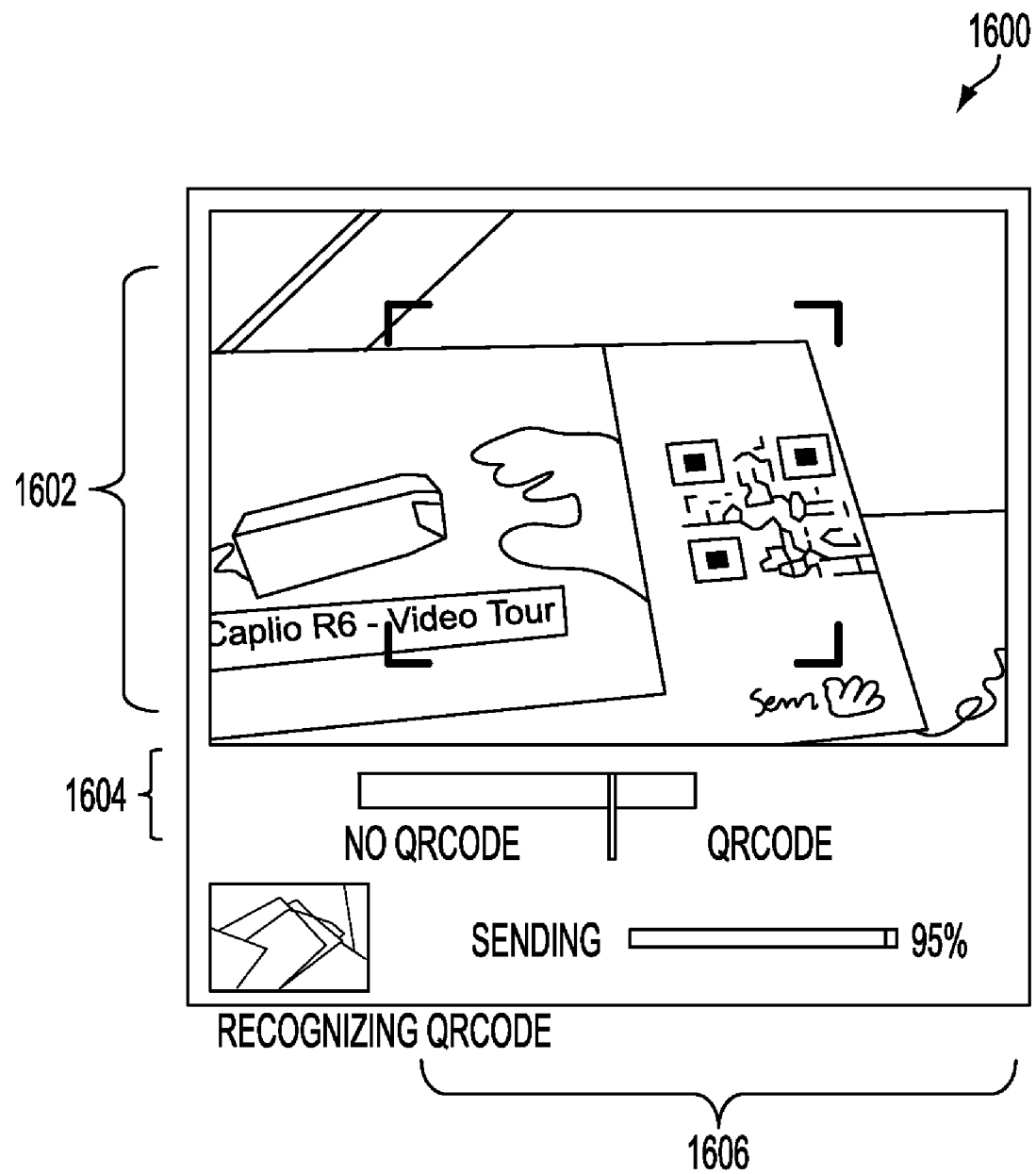
FIG. 16 is a graphical representation of a second embodiment of a user interface generated by a method for image content detection in accordance with the present invention.

FIG. 16 is a graphical representation of a user interface 1600 generated by a method for image content type detection in accordance with one embodiment of the present invention. In this example, the pre-determined content type is a QR code, but FIGS. 16-17B also correspond to the use of barcodes. The user interface 1600 includes a captured image portion 1602, a content type identification portion 1604, and a progress display portion 1606 according to one embodiment. Note that the captured image portion 1602 includes an image entitled Caplio R5—Video Tour and a QR code.

In the depicted example, the pre-determined content type is QR code. The captured image portion 1602 displays the image as captured by the capture device 104—here, a document with a QR code. The content type identification portion 1604 indicates whether and how much of the pre-determined content type (i.e., QR code) has been identified from the image. The progress display portion 1606 displays the percent progress of sending the image to be used for searching for matching content.

Figure 17A:
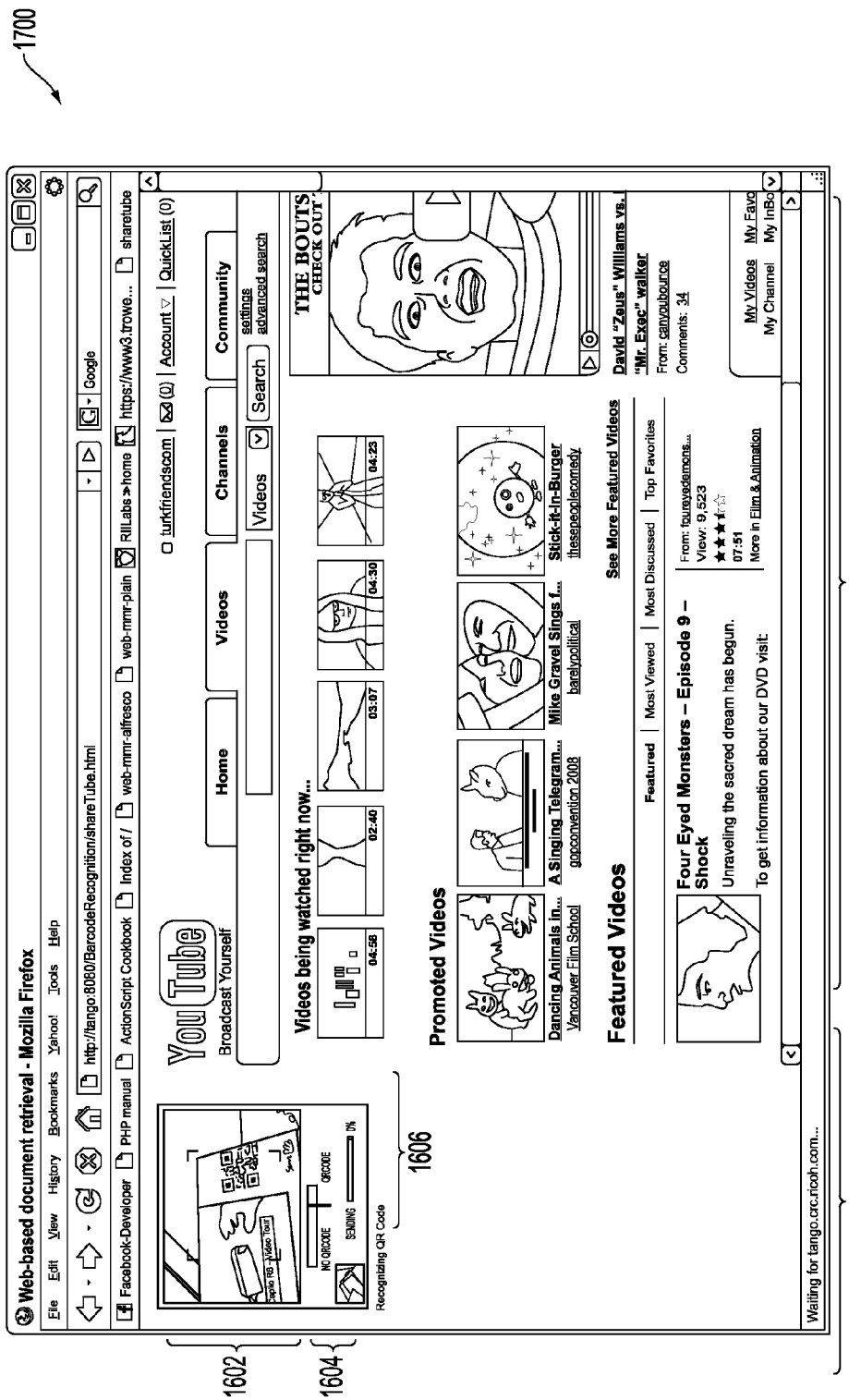
FIG. 17A is a graphical representation of a third embodiment of a user interface generated by a method for image content type detection in accordance with the present invention.

FIG. 17A is a graphical representation of a user interface 1700 generated by a method for image content type detection in accordance with one embodiment of the present invention. The user interface 1700 comprises an image identification portion 1702 and a content portion 1704. The image identification portion 1702 is similar to the user interface 1600 described above in conjunction with FIG. 16, and thus includes a captured image portion 1602, a content type identification portion 1604, and a progress display portion 1606. The content portion 1704 corresponds to the application with which the searching is associated, in this example, a video sharing website.

Figure 17B:
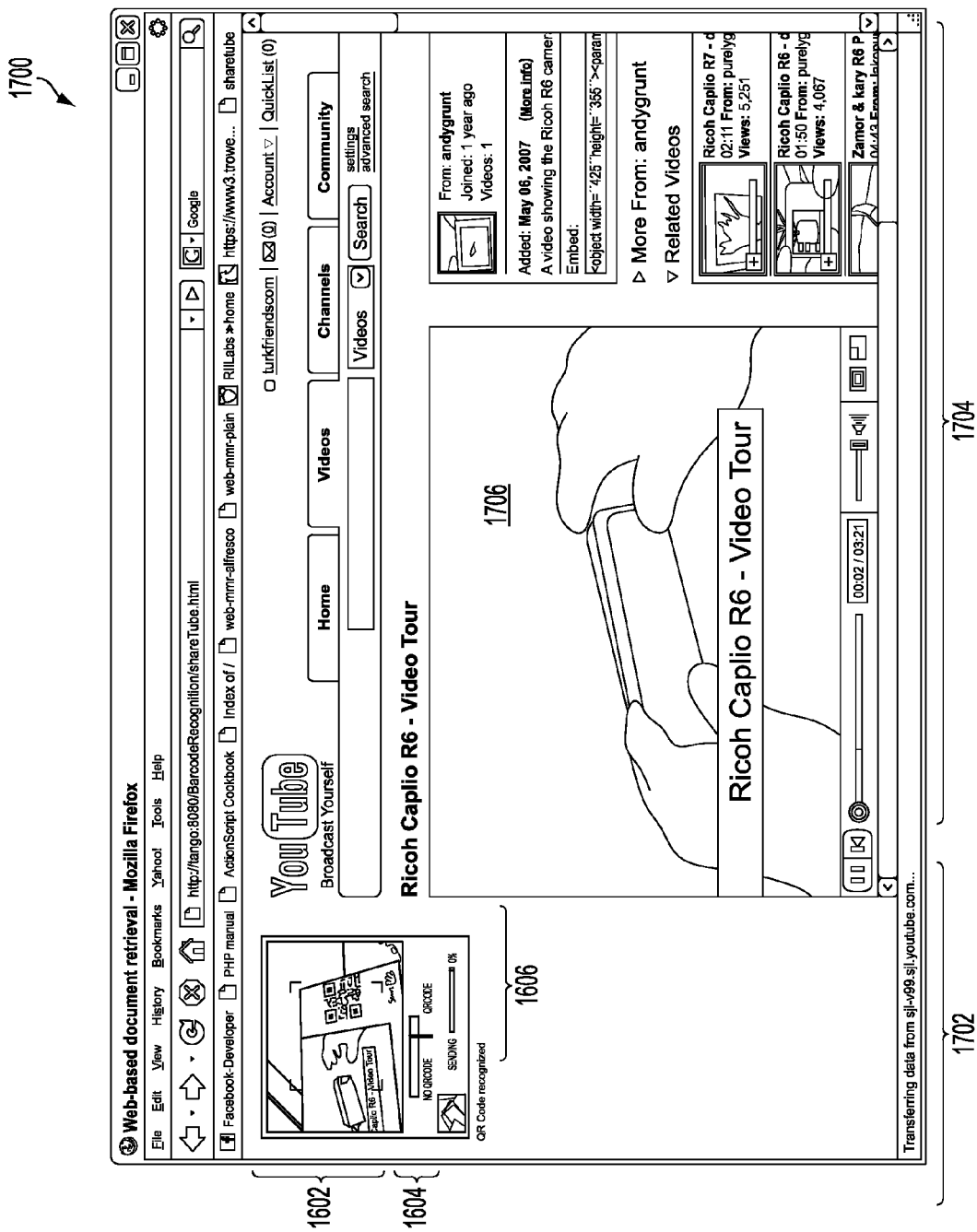
FIG. 17B shows the user interface of FIG. 17A after a video matching the QR code captured is found in accordance with one embodiment of the present invention.

FIG. 17B shows the user interface 1700 of FIG. 17A after a video matching the QR code captured (1602) is found. In this example, the content portion 1704 shows a video 1706 corresponding to the captured QR code (1602), a "Ricoh Caplio R6—Video Tour." The QR code was recognized at the server, and the video sharing website URL for the QR code was returned, initiating playback of the video in the content portion 1704.

QR code detection works similarly to the process described in conjunction with FIG. 8 with respect to text recognition. Specifically, gradients are computed 804, and apply thresholds to determine whether a QR code exists in the image (806-810). The threshold for QR code corresponds to whether there are many dark pixel to light pixel transitions. If so, the image is stamped 812 and sent to the server to be decoded, e.g., using a Tasman decoder as described herein. With respect to barcode detection, see Jamey Graham et al., The Video Paper Multimedia Playback System, MM '03 (November 2003).

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A method for web-based image content type detection using a browser plug-in, the method comprising:
   receiving an image via a capture device associated with a client;
   analyzing at the browser plug-in the image for detection of a content type;
   computing a gradient of adjacent pixels in the image;
   detecting the content type by performing edge detection based on the gradient;
   indicating how much of the content type is identified from the image, the indicating visually depicting an amount of the content type detected in the image ranging from none to all of the content type; and
   in response to the analyzing and detecting the content type within the image, transmitting the image to a server.

2. The method of claim 1, wherein the content type is at least one from a group of text, a barcode, a QR code, a fingerprint and a discernible object.

3. The method of claim 1, wherein the browser plug-in comprises a .swf file that runs in a Flash player.

4. The method of claim 1, wherein the capture device is a webcam.

5. The method of claim 1, further comprising:
   receiving from the server recognition results associated with the image; and
   displaying content associated with the recognition results.

6. The method of claim 1, further comprising receiving a webpage from the server that is associated with the image, the webpage including at least one of a comment, a marked section, a link to a uniform resource locator, a link to a document and a media clip.

7. The method of claim 1, wherein the client comprises a mobile device.

8. A method for web-based content type detection, the method comprising:
   receiving an image via a capture device associated with a client;
   analyzing the image at the client for detecting a content type within the image;
   computing a gradient of adjacent pixels in the image;
   detecting the content type by performing edge detection based on the gradient;
   indicating how much of the content type is identified from the image, the indicating visually depicting an amount of the content type detected in the image ranging from none to all of the content type;
   in response to the analyzing and detecting of the content type within the image, identifying, at the client, text image features for searching; and
   transmitting from the client the text image features for searching a document server.

9. The method of claim 8, wherein the text image features are words.

10. The method of claim 8, further comprising:
    receiving from the document server recognition results comprising a document matching the text image features; and
    displaying content associated with the recognition results.

11. The method of claim 8, further comprising receiving a webpage from the document server that is associated with the text image features, the webpage including at least one of a comment, a marked section, a link to a uniform resource locator, a link to a document and a media clip.

12. The method of claim 8, wherein the edge detection comprises calculating vertical and horizontal gradients.

13. The method of claim 8, wherein the client comprises a mobile device.

14. A method for web-based content type detection, the method comprising:
   receiving an image via a capture device associated with a client;
   analyzing the image at the client for detecting a content type within the image;
   computing a gradient of adjacent pixels in the image;
   detecting the content type by performing edge detection based on the gradient;
   indicating how much of the content type is identified from the image, the indicating visually depicting an amount of the content type detected in the image ranging from none to all of the content type;
   in response to the analyzing and detecting the content type within the image, identifying, at the client, text image features for searching; and
   performing a desktop search using the text image features as keywords.

15. The method of claim 14, further comprising receiving recognition results comprising a document matching the text image features.

16. The method of claim 15, wherein the document is selected from the group consisting of a file, an email, and a web history entry.

17. The method of claim 15, wherein the document is stored on the client.

18. The method of claim 15, further comprising displaying a thumbnail representation of the document matching the text image features and a link to the document matching the text image features.

19. The method of claim 14, wherein the edge detection comprises calculating vertical and horizontal gradients.

20. The method of claim 14, wherein the client comprises a mobile device.

21. A method for web-based content type detection using a browser plug-in, the method comprising:
   providing by a server the browser plug-in for running on a client;
   receiving an image at the server captured via a capture device associated with the client that used the browser plug-in;
   analyzing the image at the server for detecting a content type within the image;
   computing a gradient of adjacent pixels in the image;
   detecting the content type by performing edge detection based on the gradient;
   transmitting an indication to the client of how much of the content type is identified from the image, the indicating visually depicting an amount of the content type detected in the image ranging from none to all of the content type;
   in response to the analyzing and detecting the content type within the image, identifying, at the server, features for searching; and
   performing, at the server, a document recognition search using the features.

22. The method of claim 21, wherein the browser plug-in comprises a .swf file that runs in a Flash player.

23. The method of claim 21, wherein the edge detection comprises calculating vertical and horizontal gradients.

24. The method of claim 21, further comprising displaying a thumbnail representation of a document recognized using the features and a link to the document recognized using the features.

25. A system for web-based image content type detection using a browser plug-in, the system comprising:
   a capture device associated with a client for receiving an image; and
   the browser plug-in for analyzing the image, for computing a gradient of adjacent pixels in the image, for detecting the content type by performing edge detection based on the gradient, for indicating how much of the content type is identified from the image, the indicating visually depicting an amount of the content type detected in the image ranging from none to all of the content type, and for, in response to the analyzing and detecting the content type within the image, transmitting the image to a server.

26. The system of claim 25, wherein the content type is at least one from a group of text, a barcode, a QR code, a fingerprint and a discernible object.

27. The system of claim 25, wherein the browser plug-in comprises a .swf file that runs in a Flash player.

28. The system of claim 25, wherein the capture device is a webcam.

29. The system of claim 25, wherein the browser plug-in receives from the server recognition results associated with the image and the browser plug-in displays content associated with the recognition results.

30. The system of claim 25, wherein the browser plug-in receives a webpage from the server that is associated with the image, the webpage including at least one of a comment, a marked section, a link to a uniform resource locator, a link to a document and a media clip.

31. The system of claim 25, wherein the client comprises a mobile device.

32. A system for web-based content type detection, the system comprising:
   a capture device associated with a client for receiving an image;
   a browser plug-in for analyzing the image at the client, computing a gradient of adjacent pixels in the image, detecting a content type by performing edge detection based on the gradient, indicating how much of the content type is identified from the image, the indicating visually depicting an amount of the content type detected in the image ranging from none to all of the content type and, in response to the analyzing and detecting the content type within the image, identifying, at the client, text image features for searching; and
   wherein the client transmits the text image features for searching a document server.

33. The system of claim 32, wherein the text image features are words.

34. The system of claim 32, wherein the browser plug-in receives from the document server recognition results comprising a document matching the text image features and the browser plug-in displays a thumbnail representation of the document matching the text image features and a link to the document matching the text image features.

35. The system of claim 32, wherein the browser plug-in receives a webpage from the document server that is associated with the text image features, the webpage including at least one of a comment, a marked section, a link to a uniform resource locator, a link to a document and a media clip.

36. The system of claim 32, wherein the edge detection comprises calculating vertical and horizontal gradients.

37. The system of claim 32, wherein the client comprises a mobile device.

38. A system for web-based content type detection, the system comprising:
   a capture device associated with a client for receiving an image;
   a browser plug-in for analyzing the image at the client, computing a gradient of adjacent pixels in the image, detecting a content type by performing edge detection based on the gradient, for indicating how much of the content type is identified from the image, the indicating visually depicting an amount of the content type detected in the image ranging from none to all of the content type and, in response to the analyzing and detecting the content type within the image, identifying, at the client, text image features for searching; and
   a desktop search application interface for performing a desktop search using the text image features as keywords.

39. The system of claim 38, wherein the browser plug-in receives recognition results comprising a document matching the text image features.

40. The system of claim 39, wherein the document is selected from the group consisting of a file, an email, and a web history entry.

41. The system of claim 39, wherein the document is stored on the client.

42. The system of claim 39, wherein the browser plug-in displays a thumbnail representation of the document matching the text image features and a link to the document matching the text image features.

43. The system of claim 38, wherein the edge detection comprises calculating vertical and horizontal gradients.

44. The system of claim 38, wherein the client comprises a mobile device.

45. A method comprising:
   receiving a browser plug-in from an intermediary server responsive to transmitting a request to connect to the intermediary server from a browser associated with a client;
   modifying the browser plug-in based on a parameter associated with the client so that the performance of the client is optimized by the modified browser plug-in;
   receiving an image associated with a capture device, the capture device associated with the client and controlled by the browser plug-in;
   analyzing, by the browser plug-in, the image for detection of a content type;
   computing, by the browser plug-in, a gradient of adjacent pixels in the image, the gradient computed for a predetermined step of adjacent pixels in the image;
   detecting, by the browser plug-in, the content type by performing edge detection on the gradient;
   indicating, by the browser plug-in, how much of the content type is identified in the image, the indicating visually depicting an amount of the content type detected in the image ranging from none to all of the content type; and
   filtering, by the browser plug-in, the image for transmission to a recognition server, the filtering including converting the image to a bit map.

46. The method of claim 45, wherein the browser plug-in comprises a .swf file that runs in a Flash player.

47. The method of claim 45, wherein the edge detection comprises calculating vertical and horizontal gradients.

48. The method of claim 45, wherein the browser plug-in displays a thumbnail representation of a document recognized using features extracted from the image and a link to the document recognized using the features.

* * * * *